United States Patent [19]

Shimada et al.

[11] Patent Number: 4,853,710
[45] Date of Patent: Aug. 1, 1989

[54] IMAGING BY LASER BEAM SCANNING

[75] Inventors: Kazuyuki Shimada, Tokyo; Tomohiro Nakajima, Matsudo; Hiroaki Kotabe, Funabashi; Kouji Yamanobe, Tokyo; Kozo Yamazaki, Yokohama, all of Japan

[73] Assignee: Ricoh Co., Ltd., Tokyo, Japan

[21] Appl. No.: 936,079

[22] Filed: Nov. 28, 1986

[30] Foreign Application Priority Data

Nov. 29, 1985 [JP] Japan .................. 60-267243
Jan. 31, 1986 [JP] Japan .................. 61-19908
Mar. 7, 1986 [JP] Japan .................. 61-48673
Mar. 17, 1986 [JP] Japan .................. 61-57101
Mar. 27, 1986 [JP] Japan .................. 61-69524

[51] Int. Cl.4 ............................................ G01D 15/14
[52] U.S. Cl. .................................. 346/108; 346/160; 358/494
[58] Field of Search ...................... 350/6.5, 6.7, 6.8; 358/293; 346/108, 160

[56] References Cited

U.S. PATENT DOCUMENTS 3,040,627  6/1962  Bohn et al. .................. 350/6.7
4,620,200 10/1986  Fukai .......................... 346/108

Primary Examiner—Clifford C. Shaw
Attorney, Agent, or Firm—Cooper & Dunham

[57] ABSTRACT

A laser beam scanning system includes a laser for emitting a laser beam modulated with image information to be recorded and a deflecting device, such as polygon mirror, for deflecting the laser beam over a predetermined angle repetitively, so that the laser beam is scanned on a scanning surface, thereby an image is formed on the scanning surface. When a plurality of laser beams are used at the same time, the plurality of laser beams are arranged in an array inclined with respect to the scanning direction. In this case, a sync sensor generates a sync signal in response to a laser beam received in the first place. When a polygon mirror is so structured to have a reflecting surface which is defined by a curved surface having a predetermined radius of curvature, a fθ lens may be discarded. In this case, when a transparent layer is formed on this curved reflecting surface, no distortion in scanning speed is produced even without using any electrical correction. Besides, it is also preferable to control the intensity of laser beam so as to maintain the image density of a resultant image at constant.

13 Claims, 19 Drawing Sheets

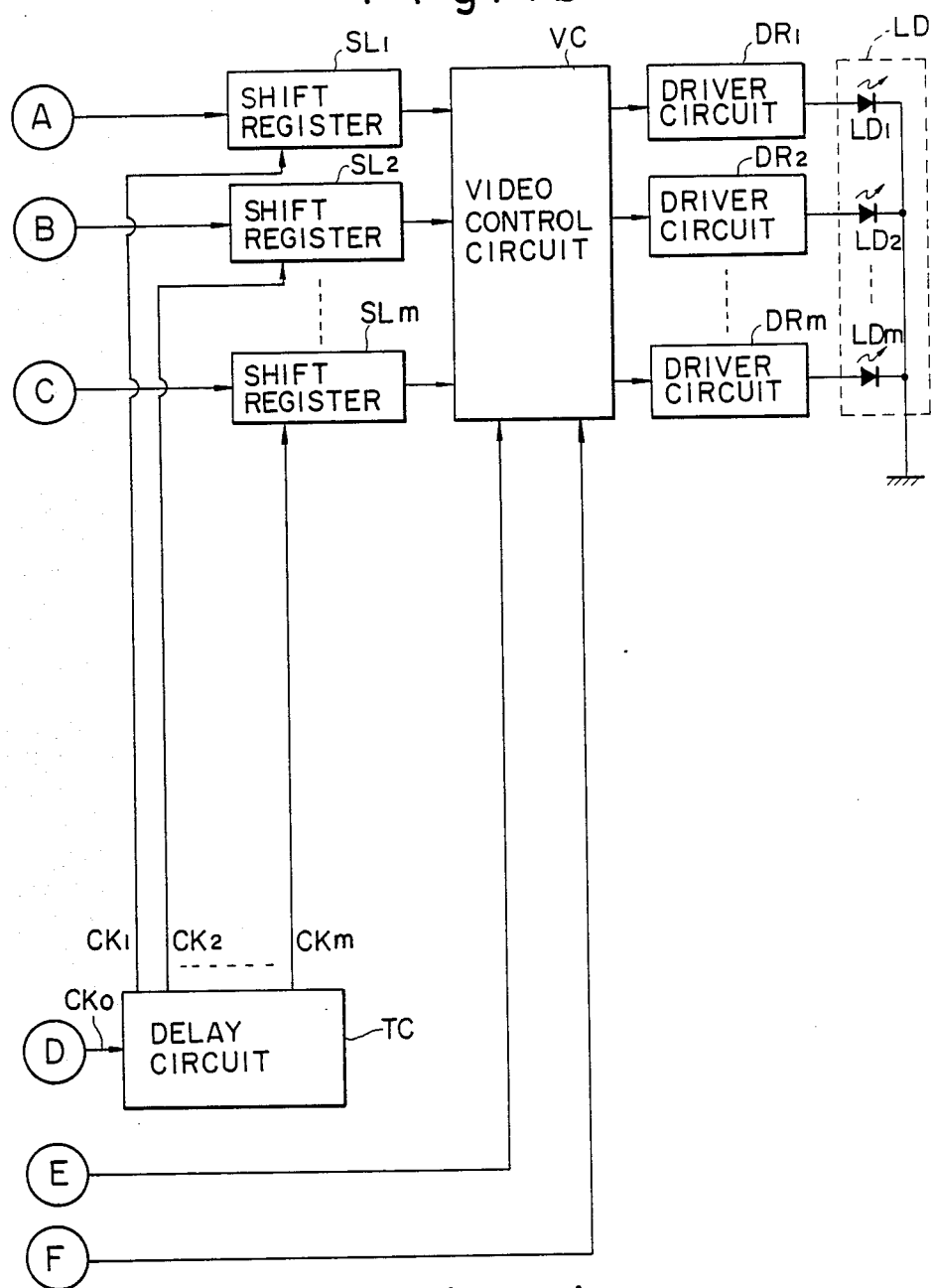

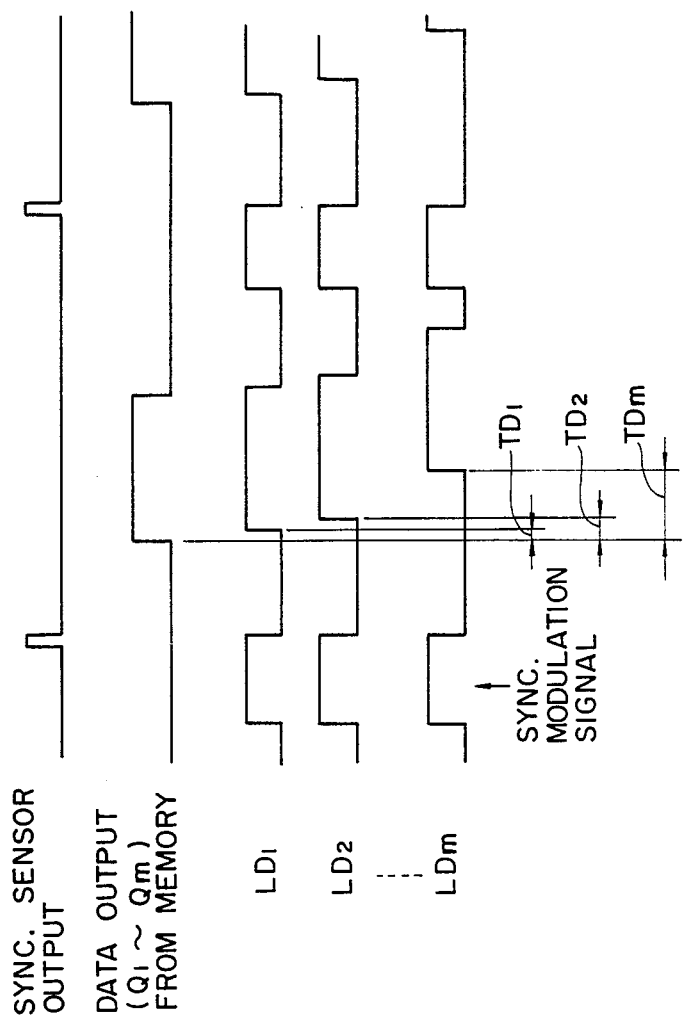

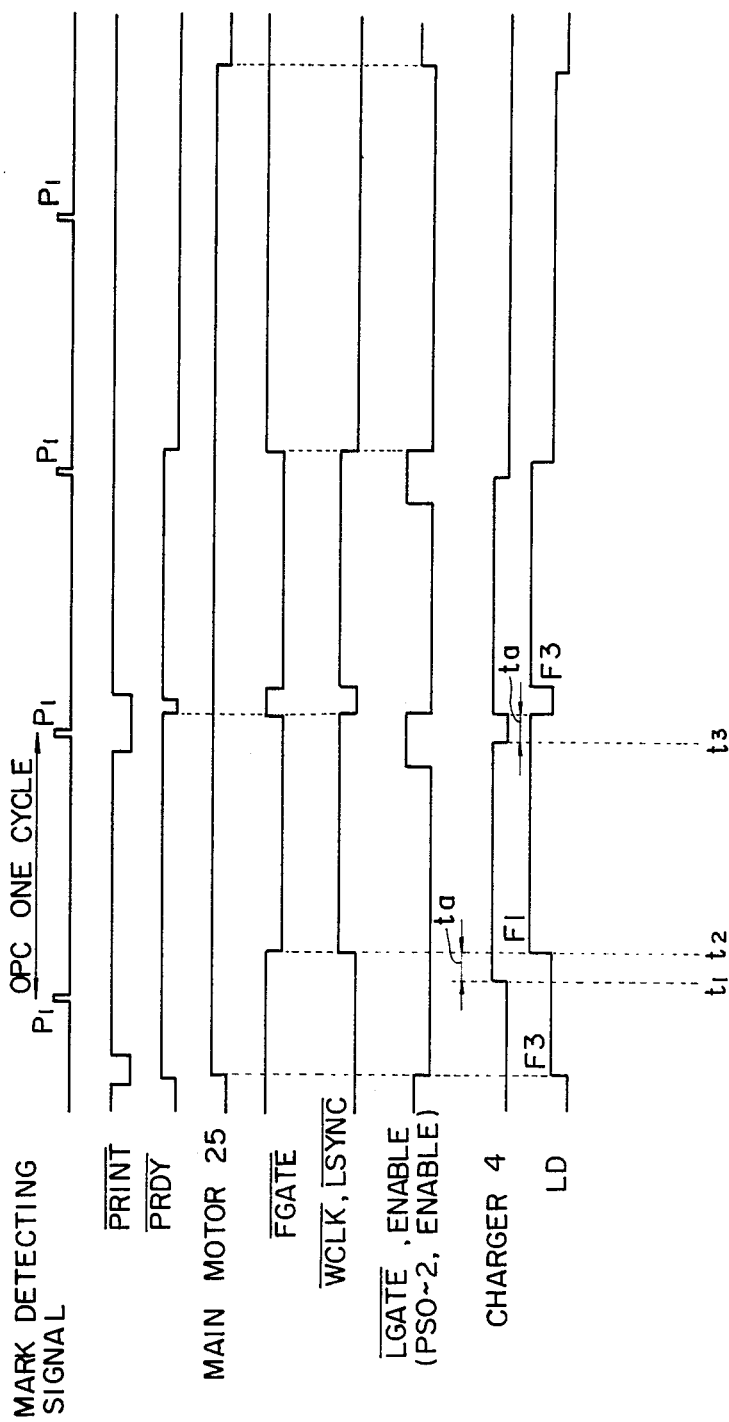

IMAGING BY LASER BEAM SCANNING

BACKGROUND OF THE INVENTION

1. Field of the Invention

This invention generally relates to an imaging method and system using laser beam scanning, and, in particular, to a laser beam scanning system and method for use in various recording machines, such as printers, copiers and facsimile machines.

2. Description of the Prior Art

A typical prior art laser beam scanning system for use in various recording machines is schematically shown in FIG. 27. As shown, the laser beam scanning system for imaging includes a semiconductor laser 201 from which a laser beam 202 modulated with an image signal supplied thereto is emitted. The laser beam thus emitted passes through a collimator lens 23 and cylindrical lens 204 and impinges on a polygon mirror 205 which is provided with a plurality of reflecting facets arranged in the circumferential direction and which rotates at high speed. Thus, the laser beam is deflected by the rotating polygon mirror 205 over a predetermined angle defined by the size of the reflecting facet repetitively. The laser beam reflected by the polygon mirror 205 then passes through a fθ lens 206, and after having been reflected by a reflecting mirror 207, the laser beam passes through a cylindrical lens 208 and is focused onto an imaging surface 209, such as a photosensitive surface.

Since the laser beam is deflected over a predetermined angle by the rotation of the polygon mirror 205, the laser beam focused on the imaging surface 209 moves along a scanning line 210. The direction of this scanning line 210 is often called an optical or main scanning direction. The imaging surface 209 is normally caused to move in a direction perpendicular to the scanning line 210 and this direction of movement of the imaging surface 209 is often called an auxiliary scanning direction. The laser beam is passed through the fθ lens 206 before being focused on the imaging surface 210 so as to cause the laser beam to move along the scanning line 210 at constant speed linearly.

A sync detecting mirror 211 is normally disposed such that it receives the laser beam which is directed to the start end 210a of the scanning line 210. Thus, the laser beam reflected by the sync detecting mirror 211 is directed to a light-receiving element 213 of a sync detecting device 212, which generates a horizontal sync signal.

Such a laser beam scanning system may be advantageously applied to various imaging machines. However, there are several aspects which still need to be improved for wider applications.

SUMMARY OF THE INVENTION

It is therefore a primary object of the present invention to provide an improved laser beam scanning method and system.

Another object of the present invention is to provide an improved laser beam scanning system which does not require the provision of a fθ lens.

A further object of the present invention is to provide an improved laser beam scanning system capable of carrying out scanning on an imaging surface substantially at constant speed along a substantially straight line without provision of a fθ lens and electrical correction.

A still further object of the present invention is to provide an improved laser beam scanning system wherein the light intensity of a laser beam emitted from a semiconductor laser is not adversely affected due to changes in the surrounding conditions, such as temperature and aging.

A still further object of the present invention is to provide an improved laser beam scanning system high in performance, simple in structure and low in cost.

Other objects, advantages and novel features of the present invention will become apparent from the following detailed description of the invention when considered in conjunction with the accompanying drawings.

BRIEF DESCRIPTION OF THE DRAWINGS

FIG. 1 is an illustration showing how FIGS. 1a and 1b are to be combined;

FIGS. 1a and 1b when combined as shown in FIG. 1 show a block diagram illustrating a laser beam scanning system including a plurality of laser units for carrying out scanning with a plurality of laser beams at the same time constructed in accordance with one embodiment of the present invention;

FIG. 2b is a schematic illustration showing the light beams emitted from the laser units arranged as shown in FIG. 2a;

FIG. 4 is a timing chart useful for understanding the operation of the system shown in FIG. 1;

FIG. 5b is a schematic side elevational view of the polygon mirror shown in FIG. 5a;

FIG. 20 is a timing chart which is useful for understanding the operation of the laser printer of FIG. 16;

DESCRIPTION OF THE PREFERRED EMBODIMENTS

Figure 1A:
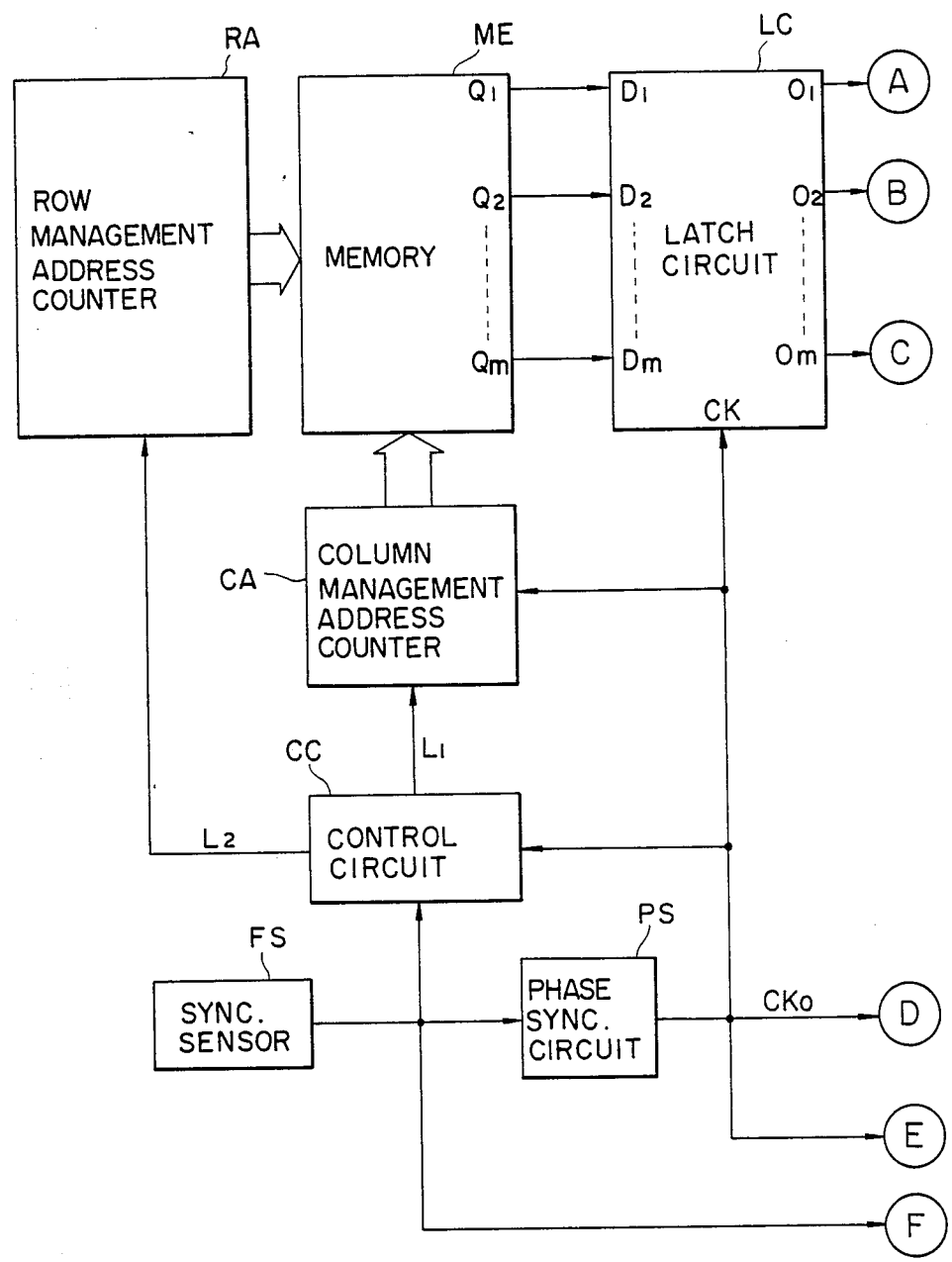

Referring now to FIGS. 1a and 1b, there is shown in block form a laser beam scanning control system for carrying out scanning with a plurality of laser beams at the same time. In accordance with this aspect of the present invention, it is so structured that image information is supplied to a plurality of laser beam emitting units in association with an image scanning clock signal which is generated in response to a laser beam which is first received by a photosensor among the plurality of laser beams.

Figure 2A:
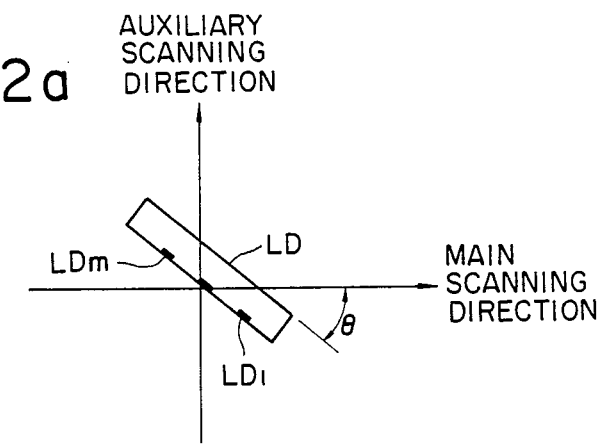
FIG. 2a is a schematic illustration showing the arrangement of a plurality of laser units of the system shown in FIG. 1 with respect to the main and auxiliary scanning direction.
Figure 2B:
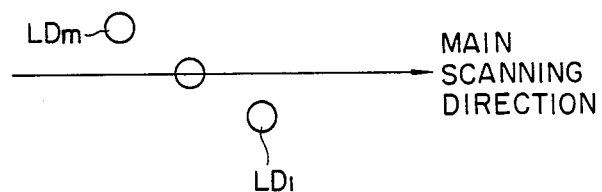

As shown in FIGS. 1a and 1b, the laser beam scanning control system includes a semiconductor laser array LD which contains a plurality (m in the illustrated embodiment) of laser diodes $LD_1$ through $LD_m$ arranged in the form of a single array. Preferably, the laser array LD is arranged such that its array direction defines an angle $\theta$ with the main scanning direction as shown in FIG. 2a. As defined previously, the main scanning direction is the optical scanning direction along which the laser beams emitted from the laser diodes $LD_1$ through $LD_m$ are scanned on a imaging surface. With such an arrangement, beam spots are formed at the same time by the laser beams emitted from the respective laser diodes $LD_1$ through $LD_m$ as shown in FIG. 2b. The beam spots thus formed on the imaging surface are not aligned with the main scanning direction, but they define the angle $\theta$ with respect to the main scanning direction due to the inclined arrangement of the laser diodes LD.

Figure 27:
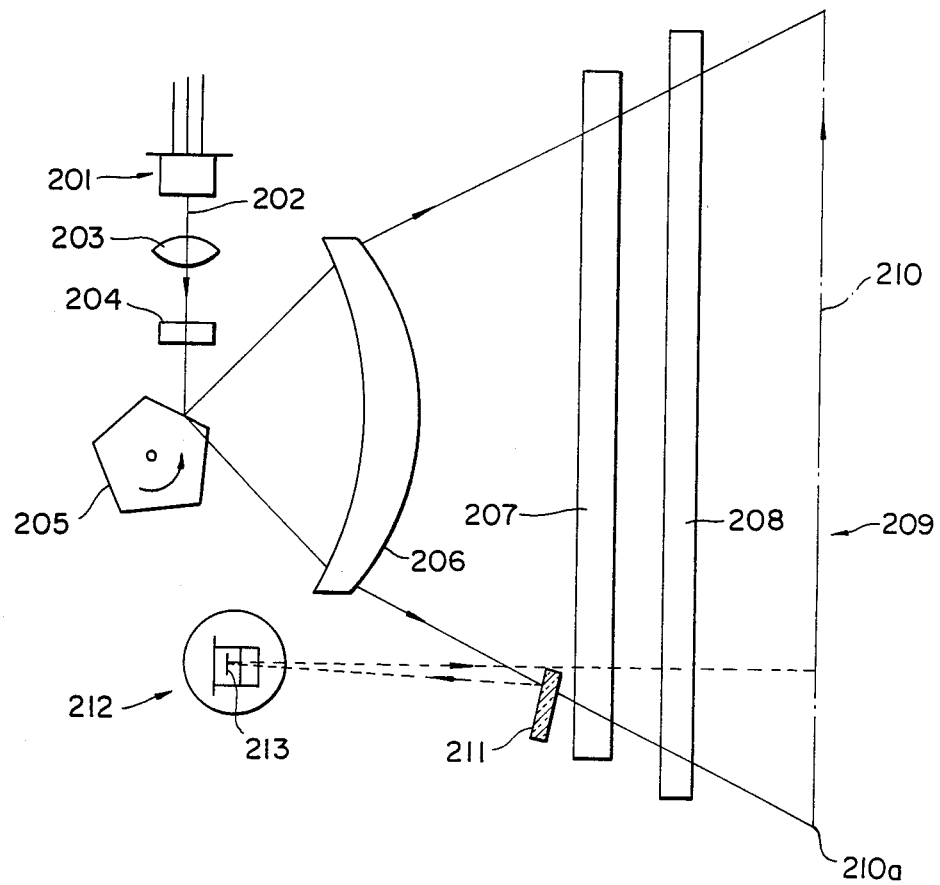
FIG. 27 is a schematic illustration showing a typical prior art laser beam scanning system suitable for use in an imaging machines, such as laser printers and facsimile machines.

A sync sensor FS corresponds to the element 212 shown in FIG. 27 and thus it is disposed outside of the image scanning region for the laser beam from each of the laser diodes $LD_1$ through $LD_m$. For example, the sync sensor FS includes a photosensor for receiving the laser beam from the laser diode $LD_1$ in the first place among the plurality of laser diodes $LD_1$ through $LD_m$ and a circuit for processing an output from this photosensor in a predetermined manner. Also provided in the system of FIGS. 1a and 1b is a phase sync circuit PS which produces and outputs a clock signal $CK_0$ upon receipt of an output from the sync sensor FS which corresponds to the laser beam received by the sync sensor FS in the first place. Thus, the clock signal $CK_0$ is synchronized with the laser beam which has been received by the sync sensor FS in the first place. It is to be noted that the phase sync circuit PS carries out phase matching within a time period of $1/N$ of a single clock, where N is equal to or larger than 2.

Upon receipt of the clock signal $CK_0$ supplied from the phase sync circuit PS, a delay circuit TC outputs image scanning clock signals $CK_1$ through $CK_m$ which correspond to the respective laser diodes $LD_1$ through $LD_m$ of the semiconductor laser array LD. Also provided in the control system shown in FIGS. 1a and 1b is a memory ME which stores image information (data) to be recorded and from which data having the address designated by a row management address counter RA and a column management address counter CA is output through output terminals $Q_1$ through $Q_m$. The column management address counter CA renews its designated address each time when the clock signal $CK_0$ from the phase sync circuit PS is input. Also provided is a control circuit CC which, in response to an output from the sync sensor FS and the clock signal $CK_0$ from the phase sync circuit PS, supplies a control signal $L_1$ to the column management address counter CA and another control signal $L_2$ to the row management address counter RA. The control signals $L_1$ and $L_2$ are required at the time of transferring the image information by the clock signal $CK_0$. The control signal $L_1$ output from the control circuit CC is a signal used to determine a data valid range in a line, and the control signal $L_2$ is a signal for changing to a new line or carriage return.

A latch circuit LC has input terminals $D_1$ through $D_m$ which are connected to the output terminals $Q_1$ through $Q_m$ of the memory ME, respectively, and a data is output from the output terminals $Q_1$ through $Q_m$ of the latch circuit LC in association with the clock signal $CK_0$ from the phase sync circuit PS. Thus, the latch circuit LC serves as a buffer circuit which functions to synchronize the data read out of the memory ME by the clock signal $CK_0$ with the clock signal $CK_0$ again. Accordingly, if no phase shift occurs among outputs from the output terminals $Q_1$ through $Q_m$ of the memory ME until these outputs reach respective shift registers $SL_1$ through $SL_m$, this latch circuit LC may be omitted. The shift registers $SL_1$ through $SL_m$ receive output data from the output terminals of the latch circuit LC and output the data in response to the respective clock signals $CK_1$ through $CK_m$ supplied from the delay circuit TC. Thus, these shift registers SL define a correction circuit for correcting the phase difference of each laser beam emitted from each of the laser diodes $LD_1$ through $LD_m$ of the semiconductor laser array LD.

Also provided is a video control circuit VC which receives data from the shift registers $SL_1$ through $SL_m$ and information from the sync sensor FS and outputs a video signal using the clock signal $CK_0$ from the phase sync circuit PS as a control clock signal. It is to be noted that the video signal output from the video control circuit VC contains a sync modulation signal which goes high when an output is obtained from the sync sensor FS. It should be noted that this sync modulation signal may not be applied to the laser diodes $LD_2$ through $LD_m$ because it is only required to be applied to the laser diode $LD_1$, whose laser beam impinges on the sync sensor FS in the first place among the laser diodes of the laser array LD. A plurality of driver circuits $DR_1$ through $DR_m$ are provided to receive output data from the video control circuit VC and they activate the respective laser diodes $LD_1$ through $LD_m$ of the semiconductor laser array LD in response to the output data received from the video control circuit VC.

Figure 3:
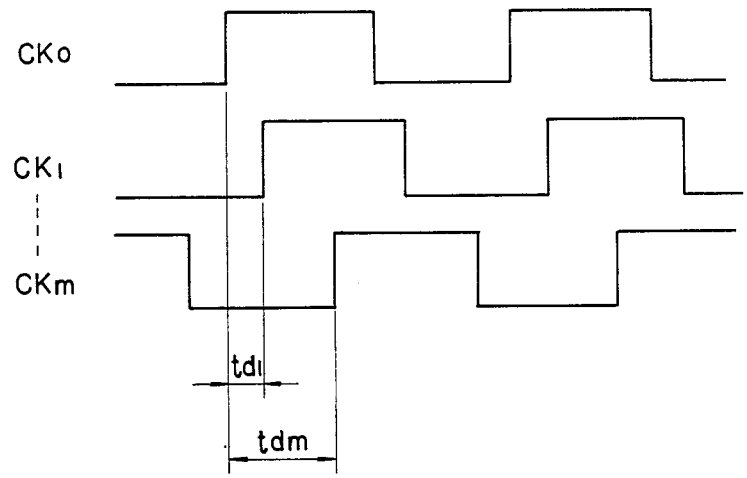
FIG. 3 is a timing chart of an image scanning clock to be applied to a corresponding one of the laser units.

Now, the operation of he control system having the above-described structure will be described with particular reference to FIGS. 3 and 4. When the sync sensor FS receives the light beam from the laser diode $LD_1$ of the semiconductor laser array LD, it supplies an output signal which is then supplied to the phase sync circuit PS which, in turn, supplies the clock signal $CK_0$ as its output. Then, the clock signal $CK_0$ is supplied to the column management address counter CA and also to the control circuit CC, whereby the image information at the designated address is read out of the memory ME and then latched into the latch circuit LC. On the other hand, in response to the clock signal $CK_0$ of the phase sync circuit PS, the delay circuit TC outputs image scanning clock signals $CK_1$ through $CK_m$ corresponding to the respective laser diodes $LD_1$ through $LD_m$ of the semiconductor laser array LD, for example as shown in FIG. 3. It is to be noted that, in FIG. 3, tdk ($k=1-m$) indicates a delay time period of an image scanning clock signal CKk ($k=1-m$) from the clock signal $CK_0$. However, there is no prescription regarding the magnitude relationship among the delay time periods td1-tdm.

Thus, the image scanning clock signals $CK_1$ through $CK_m$ from the delay circuit TC are input into the respective shift registers $SL_1$ through $SL_m$ as shift clocks, and, thus, the image information from the latch circuit LC is sequentially output from the respective shift registers $SL_1$ through $SL_m$. At this time, since each of the image scanning clock signals $CK_1$ through $CK_m$ from the delay circuit TC has a time delay corresponding to the phase difference of each of the light beams from the laser diodes $LD_1$ through $LD_m$ of the semiconductor laser array LD in the main scanning direction, the phase difference of each of the light beams from the laser diodes $LD_1$ through $LD_m$ of the semiconductor laser array LD is corrected. Then, in response to the image information transferred through these shift registers $SL_1$ through $SL_m$ and an output from the sync sensor FS, the video control circuit VC outputs a video signal which is then supplied to the driver circuits $DR_1$ through $DR_m$, thereby activating the laser diodes $LD_1$ through $LD_m$ of the semiconductor laser array LD in accordance with the video signal.

FIG. 4 illustrates the timing chart of the case in which the laser beam emitted from the laser diode $LD_1$ of the semiconductor laser array LD impinges on the sync sensor FS in the first place. In FIG. 4, TDk ($k=1-m$) indicates a time delay from the time when each data (image information) has been read out of the memory ME to the time when the corresponding one of the laser diodes $LD_1$ through $LD_m$ of the semiconductor laser array LD is activated by the corresponding image information. It is to be noted, however, that the relation of TDm being larger than TDm−1 which in turn is larger than TDm−2, . . . which in turn is larger than TD2 which in turn is larger than TD1 exists among the time delays TD1 through TDm.

In this manner, in accordance with the present recording system having the above-described structure, since image information corresponding to a plurality of light beams is read out by the image scanning clock which corresponds to that light beam which impinges on the photosensor of the sync sensor FS in the first place among the plurality of light beams, the structure of the correction circuit for correcting the phase differences among the plurality of light beams can be simplified. That is, only one clock signal (clock signal $CK_0$ in the illustrated embodiment) is required for reading each data (image information) corresponding to each of the plurality of light beams out of the memory ME, so that only one kind of address counter is required, which contributes to facilitate the memory structure. Besides, since the phase difference between the light beams is determined by the clock signals ($CK_0$ through $CK_m$) corresponding to respective light beams, the phase correction can be carried out at high accuracy, thereby allowing to obtain an imprint of high quality. Moreover, in the case where there is only one data read out line, a clock signal having a frequency equal to or larger than N (N is the number of light beams) times of the image scanning clock signal. On the other hand, in accordance with the present invention, the frequency of the read out clock signal of each image information (data) may be set equal to that of the image scanning clock signal, which is extremely advantageous.

As mentioned previously, a scanning system using a polygon mirror as a light beam deflecting unit is well known. Such a light beam deflecting unit is often called a post objective type light beam deflecting unit. In such a light beam deflecting unit, since the deflection of a light beam is carried out at equi-angular velocity, use is normally made of a $f\theta$ lens in order to make the scanning speed of the light beam along a flat scanning surface constant. However, since a $f\theta$ lens is rather expensive, it is desired to realize constant scanning on a flat surface without using a $f\theta$ lens. For this purpose, it has been proposed to electrically correct the clock period of image scanning. However, if the reflecting facet of the polygon mirror is flat, there is an increase in image surface curvature, so that a stable beam shape cannot be obtained on a scanning line. In order to correct such an image surface curvature, it has been proposed to make the facet of the polygon mirror by a cylindrical or spherical surface as disclosed in the Japanese Patent Application No. 59-274324. It is however desirous that the scanning speed of a light beam on a flat scanning surface can be made constant without the above-described electrical correction as well as the use of the $f\theta$ lens. This aspect of the present invention is directed to a novel post objective type light beam deflecting unit which allows a light beam to scan substantially at constant speed on a flat scanning surface without the use of a $f\theta$ lens and the electrical correction described in the above-mentioned patent application.

In accordance with this aspect of the present invention, there is provided a light beam deflecting unit which comprises a polygon mirror and rotating means for rotating the polygon mirror. The rotating means preferably includes a motor or any other similar driving unit. The polygon mirror has a plurality of reflecting facets arranged circumferentially and each of the facets has a curved surface. The curved surface may be a cylindrical or spherical surface and its has a radius of curvature R which is determined by the following equation with A denoting the radius of a largest circle which can be inscribed within the polygon mirror, alpha denoting the rotating angle of the polygon mirror and $2\theta$ denoting the deflection angle of a beam being deflected.

$$\sin\theta = \left(1 - \frac{A}{R}\right)\sin(\text{alpha})$$

On each facet of the polygon mirror is formed a correcting transparent layer. And, preferably, an anti-reflection film is formed on the correcting transparent layer. The correcting transparent layer has a thickness which varies as a function of the rotating angle alpha of the polygon mirror. The thickness of the correcting transparent layer is determined such that the scanning speed of a light beam along a flat scanning surface becomes substantially constant as much as possible.

Figure 5A:
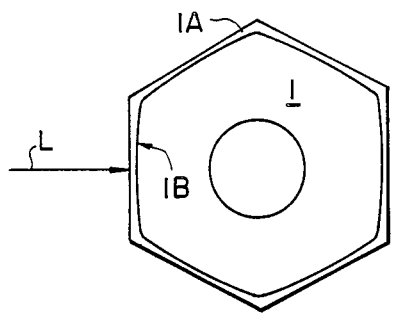
FIG. 5a is a schematic plan view showing a polygon mirror for use in a laser beam scanning system constructed in accordance with one embodiment of the present invention.
Figure 5B:
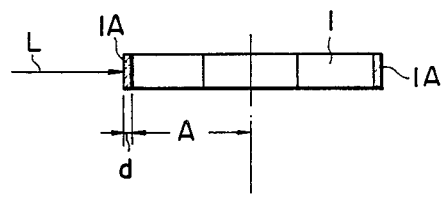

Referring to FIGS. 5a and 5b, there is schematically shown a polygon mirror suitable for use in a light beam scanning system constructed in accordance with one embodiment of the present invention. As shown, a polygon mirror 1 includes a plurality of reflecting facets 1B arranged in the circumferential direction. In the illustrated embodiment, the facet 1B has a curved surface defining part of a cylinder. For the sake of simplicity, the facet 1B will be said to have a cylindrical surface, which means that the facet 1B has a curved surface which defines part of a cylinder. On each facet 1B is formed a correcting transparent layer 1A. In FIG. 5b, reference character A indicates the radius of the largest circle inscribable within the polygon mirror 1 in contact with the facets 1B. In addition, reference character L indicate an incident light beam to be deflected by the polygon mirror 1.

As shown in FIGS. 5a and 5b, the incident light beam L impinges on the polygon mirror 1 in a direction perpendicular to the rotating axis of the polygon mirror 1. In a real arrangement, the direction of incident light beam is set t be slightly inclined with respect to the direction perpendicular to the rotating axis of the polygon mirror 1. For this reason, if a reflected light beam is directly scanned on a flat scanning surface, the resulting scanning line would not be a straight line. However, this problem may be easily solved by using a correcting cylindrical lens. It is to be noted that, in the following description regarding the novel polygon mirror 1, it will be assumed for the sake of brevity that the incident light beam L impinges on the rotating polygon mirror 1 in a direction perpendicular to the rotating axis of the polygon mirror 1.

Figure 6:
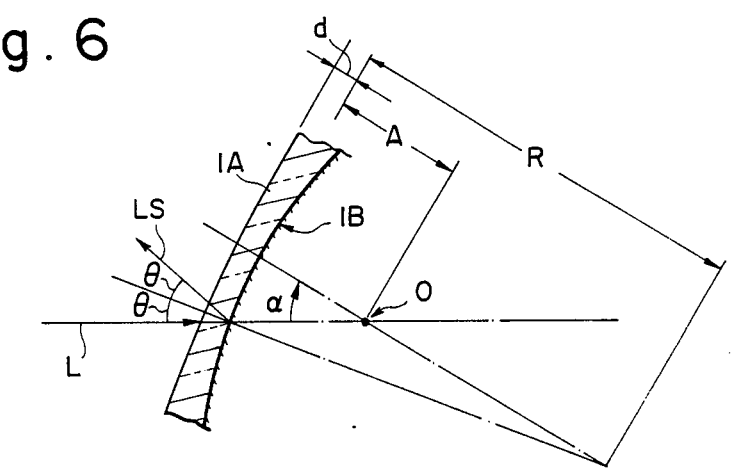
FIGS. 6 through 9 are schematic illustrations useful for understanding the structure and effects of the polygon mirror shown in FIGS. 5a and 5b.

FIG. 6 illustrates that the light beam L impinges on the rotating polygon mirror 1 which deflects the light beam L over a predetermined angle defined by the size of the facet. The deflected light beam scans straight on a flat scanning surface S which is located at a distance $L_0$ from the point of reflection on the facet of the polygon mirror 1.

FIG. 6 shows the condition in which the polygon mirror 1 has rotated clockwise over angle alpha from the condition shown in FIG. 5a. In FIG. 6, reference character O indicates the center of rotation of the polygon mirror 1 and reference character R indicates the radius of curvature of the facet 1B. And, reference character d indicates the thickness of the correcting transparent layer 1A formed on the facet 1B. As will be described in detail later, this thickness d varies along the facet 1B as a function of rotating angle alpha.

As shown in FIG. 6, the incident light beam L is reflected by the facet (mirror surface) 1B to become a deflected light beam LS. The incident and deflected light beams L and LS define an angle $2\theta$ therebetween. As indicated before, the following relation holds among the rotating angle alpha, deflected angle $2\theta$, radius of curvature R and radius of a largest circle inscribable in the polygon mirror A.

$$\sin\theta = \left(1 - \frac{A}{R}\right)\sin(\text{alpha}) \tag{1}$$

With the facet 1B which has such a curved surface, the scanning speed may be made constant to some extent. However, since its main objective is to correct image surface curvature, it is necessary to electrically modify the clock time period of image scanning in order to keep the scatter of dot-to-dot pitch due to distortion of scanning speed in an allowable range. However, in accordance with this aspect of the present invention, since the transparent layer 1A having a particular thickness is formed on the facet 1B, the distortion of scanning speed can be maintained in an allowable range without employing any electrical correction scheme.

Figure 9:
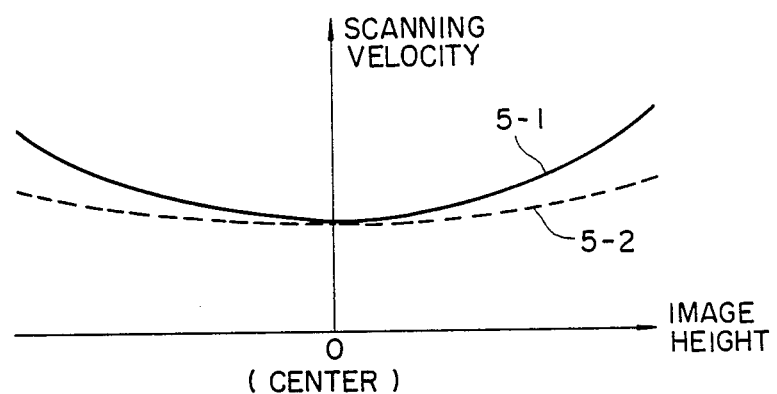

Described more in detail in this respect, in the case where the facet 1B of the polygon mirror 1 is flat, the scanning speed on the scanning surface S varies as a function of image height or spot position of the deflected light beam on the scanning surface S, as indicated by a curve 5-1 in the graph of FIG. 9. On the other hand, in the case where the facet 1B of the polygon mirror 1 is curved as indicated by the above equation (1), the scanning speed on the scanning surface S will be as indicated by a curve 5-2 shown in FIG. 9, so that there is less change in scanning speed as a function of image height. In other words, the scanning speed can be advantageously made constant substantially by using the facet 1B having a curved surface indicated by the above equation (1).

Figure 8:
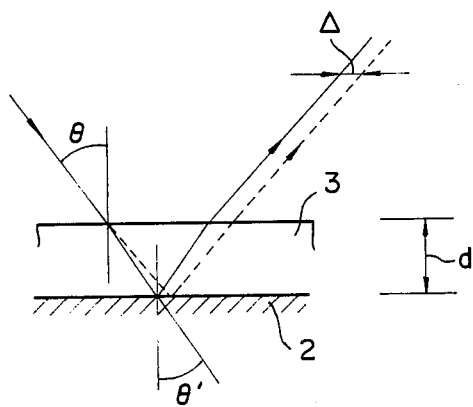

In FIG. 8, reference numeral 2 corresponds to the facet or reflecting surface 1B of the polygon mirror 1, and a transparent layer 3 having thickness d and refractive index n is formed on the facet 2. A light beam is incident upon this facet 2 at an incident angle $\theta$. Since the layer 3 has refractive index n, the actual incident angle $\theta'$ of the incident light beam with respect to the facet 2 is expressed by the following equation.

$$\theta' = \sin^{-1}\left(\frac{1}{n}\sin\theta\right) \tag{2}$$

Therefore, if no provision were made of the layer 3, then the light beam would be reflected as indicated by the dotted lines. However, with the provision of the layer 3, the light beam is reflected as indicated by the solid lines, whereby the location of the reflected light beam with the provision of the layer 3 is shifted over a distance delta horizontally. This amount delta may be expressed as follows:

delta=d(tan $\theta$ − tan $\theta'$).

When the above explanation is applied to this aspect of the present invention, since the transparent layer 1A has thickness d(alpha) and the scanning surface S is perpendicular to the incident light beam L, due to the presence of the transparent layer 1A, the position of the scanning light beam on the scanning surface is shifted toward the incident side or the central portion of the scanning by a amount delta $H(\theta)$ as compared with the case having no transparent layer 1A.

$$\text{delta } H(\theta) = d(\text{alpha})(\tan\theta - \tan\theta')(\cos\theta + \sin\theta \cdot \tan 2\theta) \quad (3)$$

Figure 7:
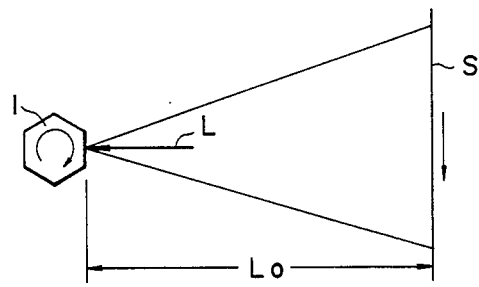

On the other hand, as may be easily understood from FIG. 7, the image height $H(\theta)$ of the deflected light beam or spot position of the deflected light beam on the scanning surface S has the following relation with respect to the deflected angle $\theta$.

$$H(\theta) = L_0 \tan 2\theta.$$

Thus, an amount of $H(\theta) - \text{delta } H(\theta)$ indicates an image height corrected by the transparent layer 1A. The specific expression of delta $H(\theta)$ is shown in the above equation (3), and it can be further modified by using the above equation (2) as will be shown below.

$$\text{delta } H(\theta) = d(\text{alpha})\left(\tan\theta - \tan\left(\sin^{-1}\left(\frac{1}{n}\sin\theta\right)\right)\right) \cdot$$
$$(\cos\theta + \sin\theta \cdot \tan 2\theta)$$

In addition, since the above equation (1) holds between the rotating angle alpha of the polygon mirror 1 and the incident angle $\theta$, $H(\theta)$ and delta $H(\theta)$ may be expressed as a function of alpha. Thus, it can be expressed as H(alpha) and delta H(alpha). As a result, H(alpha) − delta H(alpha) can provide a relation between the rotating angle alpha of the polygon mirror 1 and the image height H of the deflected light beam.

Accordingly, if it is so set to satisfy the following condition, $$\frac{\partial}{\partial d}(H(\text{alpha}) - \text{delta } H(\text{alpha})) = 0 \quad (4)$$

then, the image height of the deflected light beam becomes proportional to the rotating angle alpha of the polygon mirror 1, so that the optical scanning on the scanning surface S can be set at constant speed accurately. The parameters present in the above equation (4) include d(alpha), $L_0$, and refractive index n. The magnitude of $L_0$ may be determined as a design parameter and the refractive index n is determined by an appropriate selection of a material for the transparent layer 3. Thus, the above equation (4) becomes nothing but a differential equation which determines the thickness d(alpha) of the transparent layer 1A so as to obtain a constant scanning speed on the scanning surface S. Therefore, if the transparent layer 1A is formed on the facet 1B of the polygon mirror 1 in accordance with d(alpha) obtained by solving the differential equation resulting from the above equation (4), then the polygon mirror 1 allows to obtain a constant scanning speed on the scanning surface S without using a $f\theta$ lens.

In general, however, difficulty will be encountered when it is tried to form the transparent layer 1A on the facet 1B of the polygon mirror 1 in accordance with d(alpha) obtained by solving the above equation (4) rigorously. Because, the shape of the surface of such a transparent layer is non-spherical and non-cylindrical, and forming of such a curved surface is usually difficult. It has been found, however, that the surface of the transparent layer 1A formed on the facet 1B may be approximated by a spherical or cylindrical surface. In other words, the scanning speed on the scanning surface S can be made substantially constant even if the transparent layer 1A formed on the facet 1B has a spherical or cylindrical surface. The radius of curvature of such a spherical or cylindrical surface of the transparent layer 1A is substantially larger than the radius of curvature of the facet 1B of the polygon mirror 1, so that the scanning speed on the scanning surface S can be made substantially at constant even if the transparent layer 1A formed on the facet 1B has a flat surface. In this case, however, the refractive index n of the transparent layer 1A should be selected appropriately. In addition, it is preferable to provide an anti-reflection film on the surface of the transparent layer 1A so as to prevent the light beam from reflecting at the surface of the transparent layer 1A.

Now, a further aspect of the present invention will be described. This aspect of the present invention relates to a method and system of controlling the intensity of a light beam for use in a light scanning system. As described before, a light scanning system using a rotating deflector, such as a polygon mirror or hologram scanner, for deflecting a light beam over a predetermined angle repetitively to carry out optical scanning on a scanning surface is well known. Since such a rotating deflector, in general, deflects a light beam at equi-angular velocity, use is normally made of a $f\theta$ lens so as to make the scanning speed on the scanning surface constant. However, since such a $f\theta$ lens is rather expensive, it is desirable if such a $f\theta$ lens can be discarded.

Figure 12:
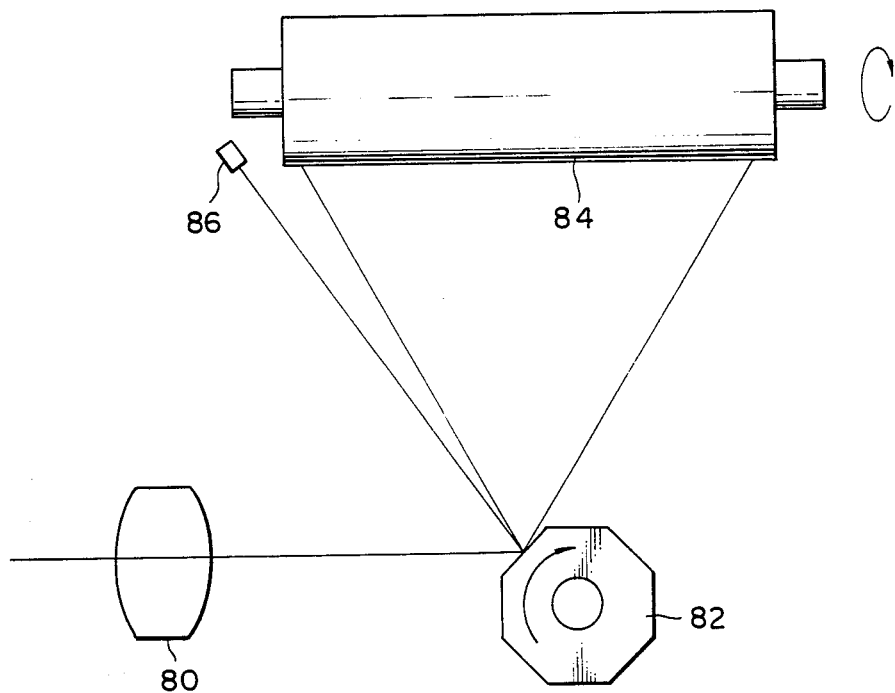
FIG. 12 is a schematic illustration showing a laser beam scanning system to which the laser beam scanning control system of FIG. 10 may be advantageously applied.

FIG. 12 schematically illustrates a light beam scanning system which allows to carry out optical scanning without using a $f\theta$ lens and to which this aspect of the present invention may be advantageously applied. As shown, a light beam passed through a lens 80 and impinges on a polygon mirror 82, and the light beam reflected by one of the facets of the polygon mirror 82 impinges on a photosensitive drum 84, whereby the light beam is focused onto the photosensitive drum 84 by the focusing action of the lens 80. When the polygon mirror 82 rotates clockwise at constant speed as indicated by the arrow, the light beam is deflected gradually from the left to the right in FIG. 12, thereby scanning the photosensitive drum 84 from the left to the right in parallel with the rotating axis of the drum 84. A photodetector 86 is disposed adjacent to the left end of the drum 84 to receive the light beam before it carries out scanning so as to synchronize the initiation of scanning. As the polygon mirror 82 rotates, the light beam coming from the lens 80 moves from one facet to another, so that the optical scanning is carried out repetitively across the width of the drum 84.

In optical scanning, if a time period allotted for writing information of one pixel is denoted by T, then a clock having a frequency fk given by 1/T is called an image scanning clock.

In a scanning system having no $f\theta$ lens, the scanning speed of a light beam on a scanning surface is not at constant, so that, if the frequency fk of the image scanning clock is maintained at constant, there is produced a distortion in recorded information. In order to eliminate such distortion of information, it is necessary to vary the frequency fk in accordance with changes in the scanning speed on the scanning surface. That is, it is necessary to set the frequency fk of the image scanning clock at high level where the scanning speed is high and at low level where the scanning speed is low. In this manner, by varyingly set the frequency fk of the image scanning clock in accordance with the level of scanning speed, distortions in recorded information can be advantageously reduced. However, as mentioned before, the frequency fk is an inverse of the time period T allotted for recording of a single pixel. Thus, a variation of frequency fk corresponds to a variation of time T. Under the circumstances, if the intensity of light beam is at constant during scanning, there will be a difference in the amount of light energy used for recording a single pixel between a location where the scanning speed is high (short time T) and a location where the scanning speed is low (long time T). This means that the light exposure amount per pixel varies depending on the scanning speed, which would cause an image density variation in the resulting recorded image depending on the scanning speed.

In order to cope with such a situation, it is only necessary to vary the light intensity level of a light beam for use in optical scanning in accordance with the scanning position. For example, if the light intensity P of a light beam for use in optical scanning is varied to be low at the center and high at ends of a scanning region as shown in FIG. 13a as a function of scanning position, the image density of a recorded image may be kept at constant.

As a light or beam source of such an optical scanning system, it is becoming popular to use a semiconductor laser. In a semiconductor laser, since the light intensity of an emitted beam may be varied by operating current, an image information signal can be directly converted into a light signal by modulating the operating current with the image information signal. However, in the characteristic between the operating current and the light intensity of emitted light of a semiconductor laser, the so-called differential quantum efficiency, i.e., rate of average increase of light intensity per unit operating current, tends to decrease due to temperature increase in a semiconductor laser and a deterioration, for example, by aging. For this reason, the following problems may be encountered when use is made of a semiconductor laser as a light source of an optical scanning system.

Figure 13:
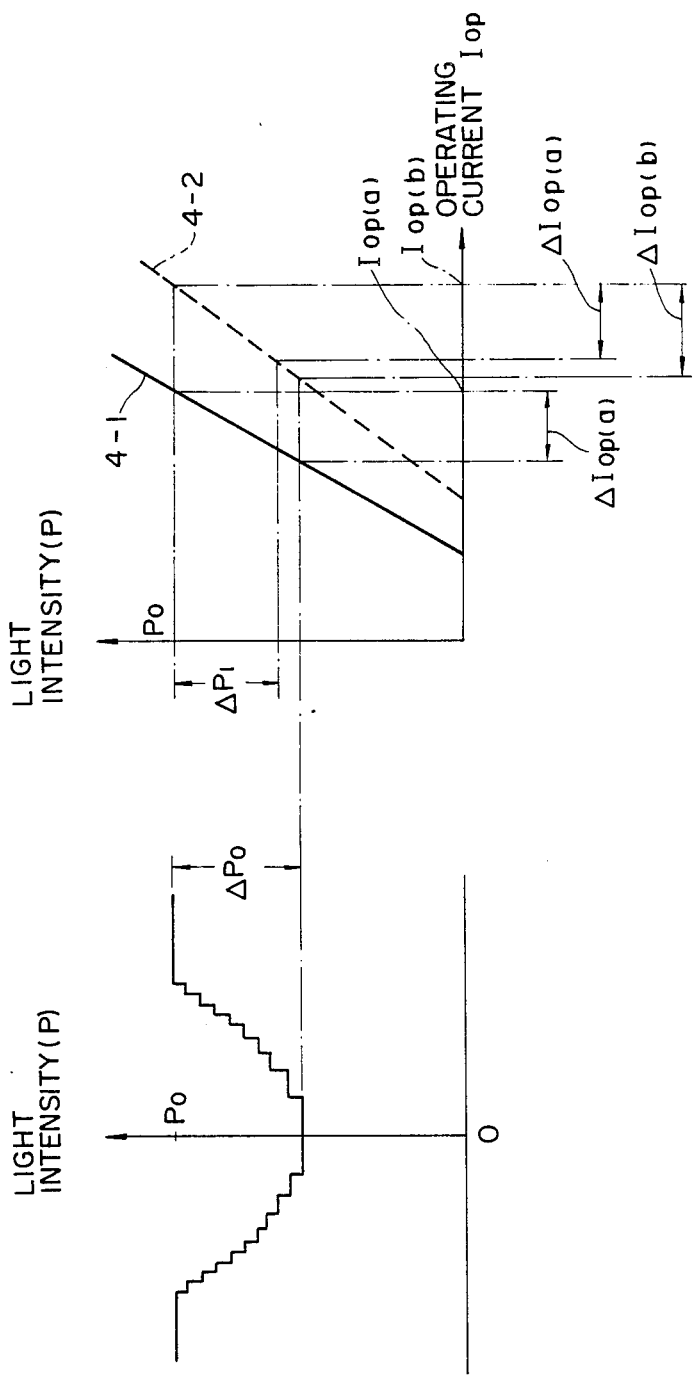
FIGS. 13a and 13b are graphs which are useful for understanding the problem to be solved by the system shown in FIGS. 10 and 11.

For example, let us consider a case in which the light intensity P of a light beam scanning at each end of a light scanning region is set at a reference intensity $P_0$ and the light intensity P is varied over an amount delta $P_0$ at maximum during scanning, as shown in FIG. 13a. FIG. 13b shows a graph illustrating a characteristic between operating current Iop and light intensity P of a semiconductor laser. In FIG. 13b, a straight line 4-1 shows a characteristic under normal operating condition and a straight line 4-2 shows a characteristic at the time of temperature increase or deterioration. The before-mentioned differential quantum efficiency is nothing but a slope of each of these characteristic curves (or straight lines in the illustrated example). Hereinbelow, this characteristic will be referred to as I-P characteristic.

In the case where the light intensity P is varied between a maximum value of $P_0$ and a minimum value of $P_0 - $ delta $P_0$ during scanning, while a semiconductor laser is in a normal operating condition, the operating current is set at Iop(a) for the reference light intensity $P_0$ and at Iop(a) - delta Iop(a) for the light intensity $P_0 - $ delta $P_0$. Conventionally, the amount of delta Iop(a) was set at constant and the operating current Iop was controlled so as to obtain the reference light intensity $P_0$. However, in such a control method, although no problem arises as long as the I-P characteristic of a semiconductor laser stays in a normal condition, an appropriate light intensity control operation cannot be carried out if the I-P characteristic varies due to temperature increase and/or deterioration, such as aging.

Let us consider the case in which the I-P characteristic of a semiconductor laser has changed from the straight line 4-1 (normal condition) shown in FIG. 13b to the straight line 4-2 (temperature increase and/or deterioration) shown in FIG. 13b. In this case, the operating current corresponding to the reference light intensity $P_0$ automatically changes to Iop(b) as a result of a control operation. However, for the characteristic line 4-2, the operating current of delta Iop(b) is necessary so as to vary the light intensity P over an amount of delta $P_0$. However, as indicated above, if the amount of delta Iop(a) is fixed, a maximum amount of variation of light intensity for the characteristic line 4-2 is limited to delta $P_1$ and thus a desired amount of variation delta $P_0$ cannot be obtained.

This aspect of the present invention is intended to obviate the above-described disadvantages and it has its object to provide a novel light intensity control method and system which allows to obtain a proper light intensity level of a scanning light beam at all times even if the I-P characteristic of a semiconductor laser varies due, for example, to temperature change and/or a deterioration, such as aging.

Figure 14:
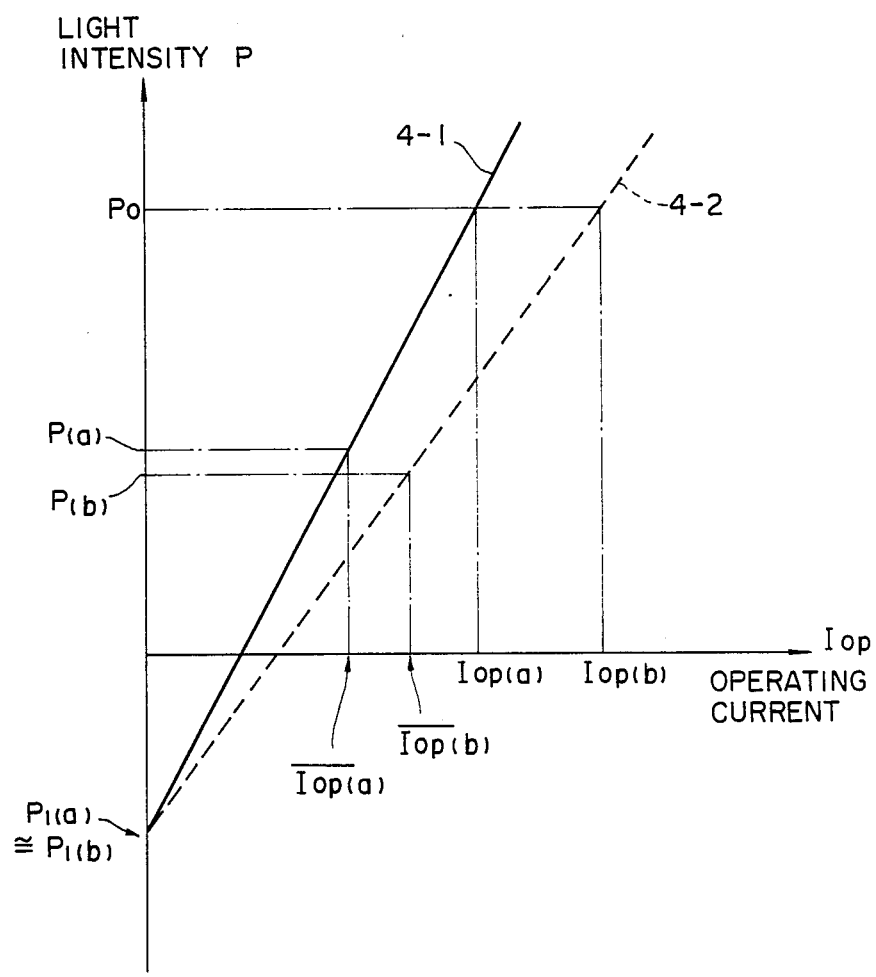
FIG. 14 is a graph which is useful for understanding the operation of the system shown in FIGS. 10 and 11.

Referring now to FIG. 14, the principle of this aspect of the present invention will first be described. In the graph shown in FIG. 14, straight lines 4-1 and 4-2 show I-P characteristics of a semiconductor laser similarly with the graph of FIG. 13b. The line 4-1 shows an I-P characteristic under normal operating condition and the line 4-2 shows an I-P characteristic at the time of temperature increase and/or deterioration, such as aging. The differential quantum efficiencies for these characteristic lines 4-1 and 4-2 will be denoted by Y(a) and Y(b), respectively. It is to be noted that $P_1(a)$ and $P_1(b)$ are the values of lines 4-1 and 4-2, respectively, when the operating current Iop is zero, and $P_1(a)$ is substantially equal to $P_1(b)$. On the other hand, $P_0$ indicates the reference value of light intensity of a laser light beam emitted from a semiconductor laser. This reference value $P_0$ is set by a reference value signal of an output intensity control circuit, as will become clear later. Thus, the operating current Iop is automatically set by this reference value signal in accordance with an I-P characteristic, and it is automatically set to Iop(a) when the I-P characteristic corresponds to the line 4-1 and to Iop(b) when the I-P characteristic corresponds to the line 4-2.

Using the nomenclature defined in FIG. 15, the I-P characteristic lines 4-1 and 4-2 may be expressed as indicted below, respectively.

$$P_0 = Iop(a) \cdot Y(a) + P_1(a) \qquad (5a)$$

$$P_0 = Iop(b) \cdot Y(b) + P_1(b) \qquad (5b)$$

Next, let us consider a correction voltage value Vc which is obtained from an image scanning clock frequency control circuit. This correction voltage value Vc corresponds to the frequency of image scanning clock, and the frequency of image scanning clock varies in accordance with the scanning speed. Thus, the correction voltage value Vc is also a function of scanning speed v so that it can be expressed as Vc(v). This correction voltage value Vc(v) is generated independently of the I-P characteristic of a semiconductor laser. Thus, fluctuations in the I-P characteristic of a semiconductor laser would not affect the correction voltage value Vc(v) in any manner.

As an implementation of this aspect of the present invention, let us consider the case in which the light intensity of a semiconductor laser is set at P(a) under normal operating condition according to the characteristic line 4-1 for the scanning velocity of v and the I-P characteristic has been shifted to the line 4-2, thereby causing the light intensity to be shifted to P(b). The operating current corresponding to these P(a) and P(b) will be denoted by $\overline{Iop(a)}$ and $\overline{Iop(b)}$, respectively. Under the circumstances, the following relations hold.

$$P(a) = \overline{Iop(a)} \cdot \overline{Y(a)} + P_1(a) \tag{6a}$$

$$P(b) = \overline{Iop(b)} \cdot \overline{Y(b)} + P_1(b) \tag{6b}$$

The correction voltage value Vc(v) is to provide a light intensity of a semiconductor laser at the time when the scanning velocity is v, and this correction voltage value Vc is processed in the form of multiplication by the reference value signal. Since the reference value signal is a signal to provide the reference light intensity $P_0$, if this is set as $V_0(a)$ for the characteristic line 4-1 and as $V_0(b)$ for the characteristic line 4-2, the following relation holds.

$$V_0(a):V_0(b) = Iop(a):Iop(b)$$

Then, if $V_0(a)$ and $V_0(b)$ are processed by $V_c(v)$ in the form of multiplication, we obtain the following relation.

$$V_0(a) \cdot V_c(b) \cdot V_c(v) = \overline{Iop(a)}:\overline{Iop(b)}$$

However, since $V_c(v)$ does not depend on the I-P characteristic, we have the following equation.

$$V_0(a):V_0(b) = V_0(a) \cdot V_c(v):V_0(b) \cdot V_c(v)$$

Thus, we finally obtain the following result.

$$Iop(a) : Iop(b) = \overline{Iop(a)}:\overline{Iop(b)} \tag{7}$$

Substituting the above equation (7) into the equations (5) and (6) and arranging by using the relation of $P_1(a)$ being substantially equal to $P_1(b)$, we finally obtain $$P(a) \approx P(b). \tag{8}$$

Therefore, if the scanning speed is at an arbitrary value v within a predetermined velocity range, even if the I-P characteristic fluctuates, the light intensity of a laser light beam from a semiconductor laser remains unchanged substantially.

Figure 10:
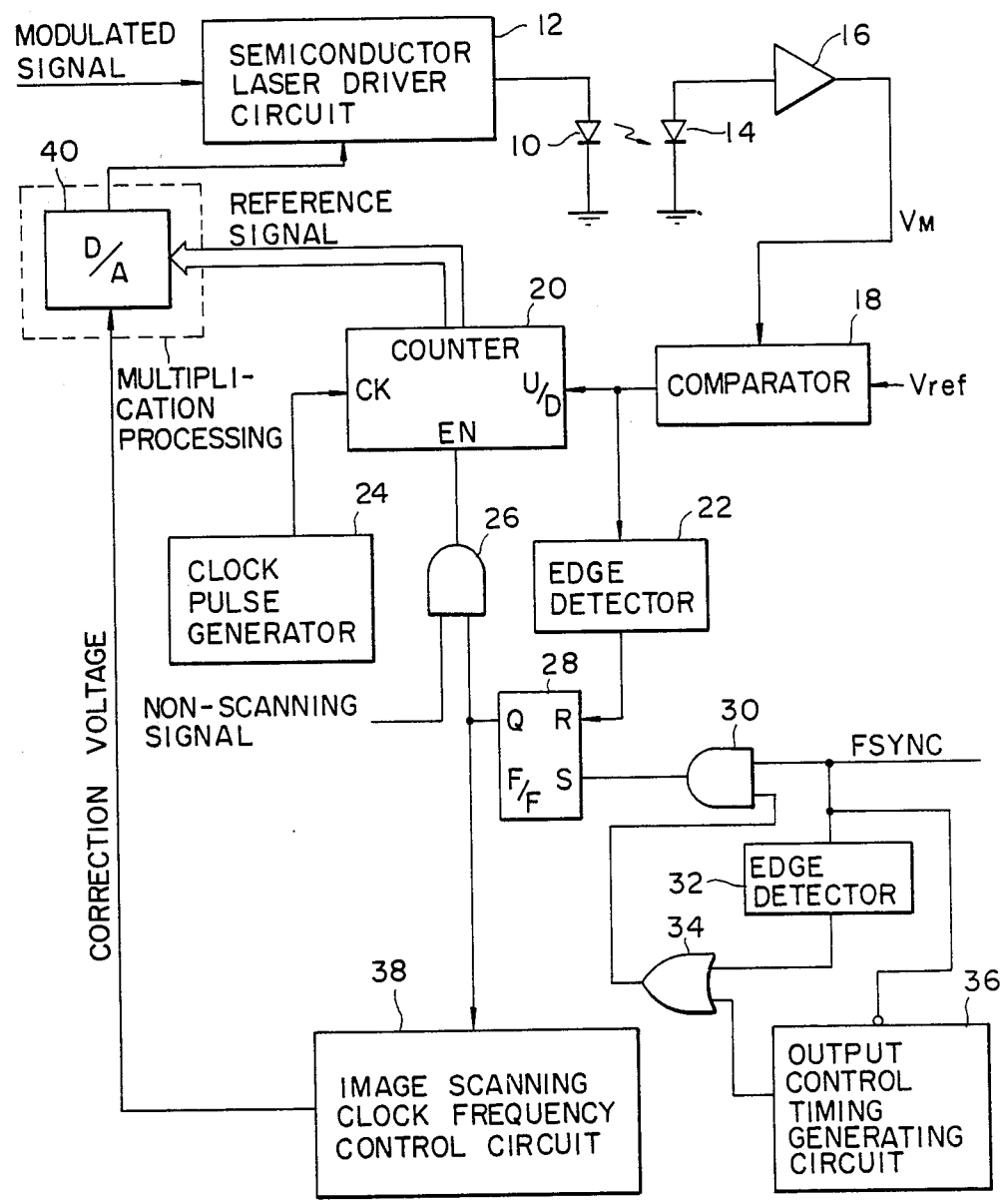
FIG. 10 is a block diagram showing a laser beam scanning control system provided with a scheme for maintaining the laser beam emitting characteristic of a laser beam at constant constructed in accordance with one embodiment of the present invention.

A specific embodiment of this aspect of the present invention will now be described in detail below with particular reference to FIG. 10. It is to be noted that a circuit shown in FIG. 10 defines the output intensity control circuit excepting an image scanning clock frequency control circuit 38. In the first place, with reference to FIG. 10, setting of the light intensity of a semiconductor laser to a reference value and generation of a reference value signal will be described.

A laser light beam emitted from a semiconductor laser 10 is received by a photosensor 14 which then outputs current in proportion to the intensity of received light. The output current is converted into a voltage by an amplifier 16 and this converted voltage $V_M$ is applied to a comparator 18 where it is compared with a reference voltage Vref. An output voltage of the comparator 18 becomes a high or low level depending on the result of comparison between $V_M$ and Vref and this output voltage is supplied to an up/down counter 20 to control its count mode of operation. For example, if $V_M$ is smaller than Vref, i.e., the output intensity of the semiconductor laser 10 does not reach the reference level, then the output of the comparator 18 becomes low level so that the counter 20 is set in an up mode, thereby serving as an up counter; on the other hand, if $V_M$ is larger than Vref, then the counter 20 is set in a down mode so that it serves as a down counter.

An edge detecting circuit 32 detects a rising edge of a frame sync signal FSYNC and its detected signal passes through an OR gate 34 and is ANDed with the frame sync signal FSYNC at an AND gate 30. A flip-flop 28 is set to produce an output signal at the beginning of a stand-by mode by an output from the AND gate 30, and this output signal is ANDed with a non-scanning signal at an AND gate 26. The counter 20 is released from its disabled state by an output signal from the AND gate 26 and counts clock pulses from a clock pulse generating circuit 24 in an up or down mode. A count output from the counter 20 is converted into an analog value by a D/A converter 40, which analog value is then applied to a semiconductor laser driver circuit 12, which, in turn, drives the semiconductor laser 10 in accordance with a modulation signal, whereby its operating current is varied in accordance with the output from the D/A converter 40. Therefore, as the count of the counter 20 gradually increases (or decreases), the intensity of a laser light beam emitted from the semiconductor laser 10 gradually increases (or decreases), and thus the voltage $V_M$ applied to the comparator 18 gradually increases (or decreases).

If the voltage $V_M$ gradually changes and its relative relation in magnitude with Vref is reversed, the output from the comparator 18 is also inverted from its low level to high level (or high level to low level). At this time, another edge detecting circuit 22 detects a rising (or falling) edge of the output from the comparator 18 and thus causes the flip-flop 28 to be reset, so that the counter 20 is returned to its disabled condition. Accordingly, the counter 20 retains the count when the output from the comparator 18 has been inverted, so that the magnitude of the driving current for the semiconductor laser 10 is maintained as it is. At this time, $V_M$ is substantially equal to Vref, so that the output intensity of the semiconductor laser 10 is set to a reference value which is set through the reference voltage Vref. In this manner, with the intensity of light beam emitted from the semiconductor laser 10 set at a reference value, a digital signal output from the counter 20 constitutes a reference value signal.

Alternatively, it may be so structured that the edge detecting circuit 22 renders the counter 20 in a disabled state only when the output from the comparator 18 is inverted from its low level to high level. With such an alternative structure, the operation remains the same as described above when the output level of the comparator 18 is inverted from its low level to high level; however, the operation will follow as will be described below when the output level goes from its high level to low level. That is, when the output level is inverted from its high level to low level, the counter 20 will act as an up counter with its disabled condition released. And, the driver current of the semiconductor laser 10 increases, and when the output from the comparator 18 is inverted from its low level to high level, the edge detecting circuit 22 detects its rising edge to have the counter 20 disabled, thereby retaining its current count.

Alternatively, it may be so structured that the counter 20 serves as a down counter with the output from the comparator 18 at its low level and as an up counter with the output at its high level, in which the count of the counter 20 is inversely proportional to the driver current of the semiconductor laser 10.

An output control timing generating circuit 36 operates in a stand-by mode by the frame sync signal FSYNC and supplies an output control timing signal at a predetermined frequency to the OR gate 34, thereby causing to carry out power setting of the semiconductor laser 10 at a predetermined frequency.

When scanning a photosensitive member, the non-scanning signal terminates to close the AND gate 26 so that the counter 20 is rendered disabled, whereby the semiconductor laser 10 is not driven in the case of scanning in a stand-by condition and power setting of the semiconductor laser 10 is terminated if not completed. And, the power setting is resumed during the non-scanning mode. When the light intensity of a laser beam emitted from the semiconductor laser 10 is set at a reference value, the reference value signal is obtained from the counter 20. Although there is a possibility that this reference value signal fluctuates each time when power setting is carried out, it will not change until the next power setting once carried out.

Figure 11:
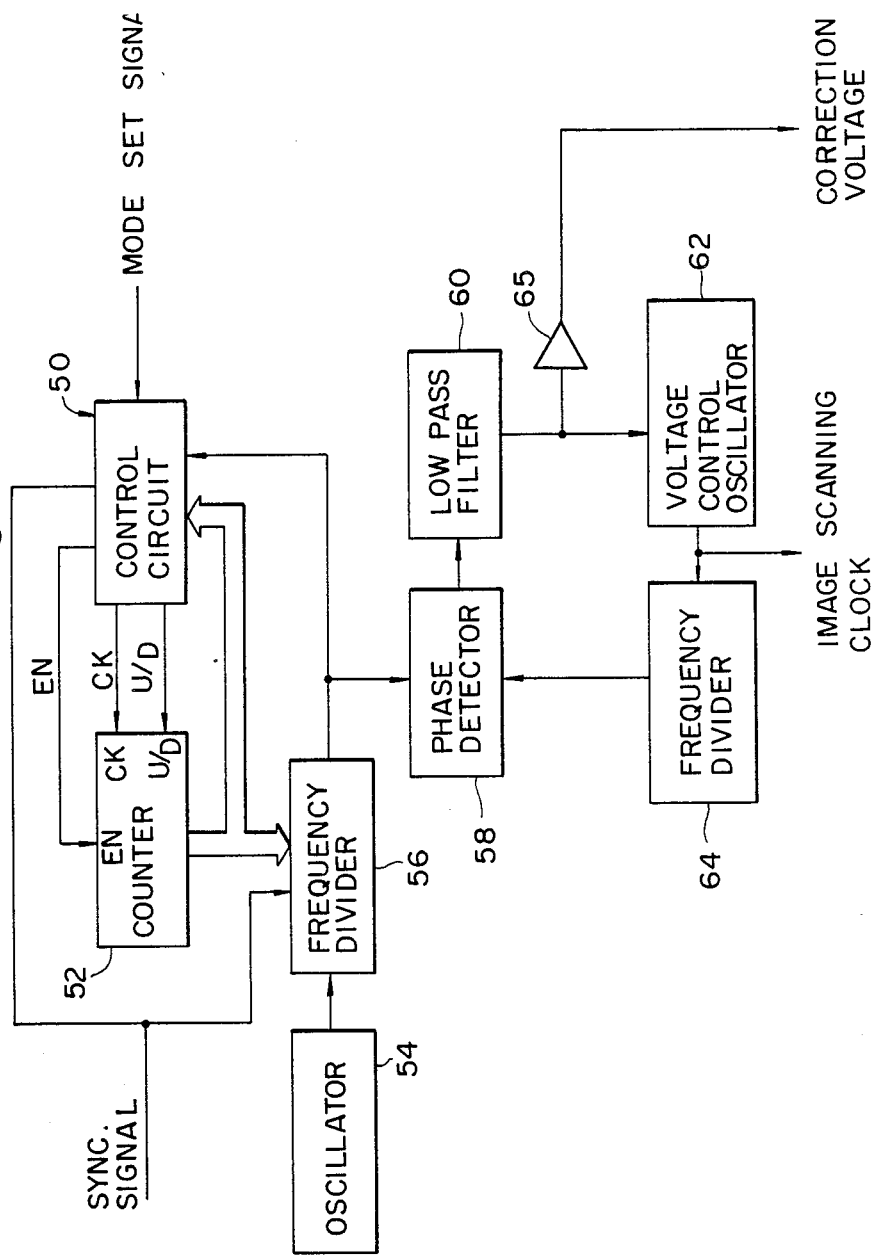
FIG. 11 is a block diagram showing the structure of a circuit for controlling the frequency of an image clock signal.

Next, generation of a correction signal will be described. FIG. 11 shows in detail one example of the image scanning clock frequency control circuit 38 shown in FIG. 10. In this image scanning clock frequency control circuit 38, a phase detecting circuit 58, a low pass filter 60, a voltage control oscillator 62 and a frequency divider 64 defines a phase locked loop (also referred to as PPL hereinafter). A reference clock having frequency $f_0$ output from an oscillator 54 is input into the frequency divider 56 which outputs a position controlling clock having frequency $f_0/N$ which in turn is input into a control circuit 16 and also to the phase detecting circuit 58 of the PPL. The phase detecting circuit 58 compares the above-mentioned position controlling clock with the clock supplied from the frequency divider 64 and supplies its phase difference as a pulse signal to the low pass filter 60. When the information of this phase difference is supplied to the voltage control oscillator 62 through the low pass filter 60, the oscillator 62 outputs a clock having a frequency responsive to an output voltage from the low pass filter 60. This clock becomes the image scanning clock. The image scanning clock is input into the frequency divider 64 which then supplies the clock to the phase detecting circuit 58 where the phase of the clock is compared with the phase of the position controlling clock.

The frequency divider 64 has a fixed rate M of frequency division, and in the case where the phase difference between the clock applied to the phase detecting circuit 58 from the frequency divider 64 and the position controlling clock having the frequency of $f_0/N$ remains unchanged, the frequency fk of the image scanning clock output from the voltage control oscillator 62 is determined by $fk = f_0(M/N)$. Under this condition, when the rate of frequency division of the frequency divider 56 is switched from N to $N_1$, the frequency of the position controlling clock becomes $f_0(1/N_1)$ and the frequency fk of the image scanning clock changes continuously and monotonically from $f_0(M/N)$ to $f_0(M/N_1)$. Accordingly, by switching the rate of frequency division of the frequency divider 56 in a stepwise fashion, there is obtained the image scanning clock whose frequency changes continuously.

The control circuit 50 outputs a clock CK for causing a preset value of the rate of frequency division in the frequency divider 56 to be output from the up/down counter 52, a signal EN for releasing the disabled condition and a signal U/D for setting either an up or down mode. A sync signal obtained from the photodetector 86 (see FIG. 12) is supplied to the control circuit 50 and also to the frequency divider 56. Regarding switching of up and down modes, it is so structured that the signal U/D is generated to switch from the up mode (or down mode) to the down mode (or up mode) in the vicinity of the extreme values of the scanning speed. When the clock CK is input, the counter 52 renews its preset value, thereby switching the rate of frequency division of the frequency divider 56. The switching interval delta N remains unchanged.

The scanning region in which optical scanning is carried out is previously divided into a plurality of blocks BL1, BL2, ..., BLi, ..., BLK, and values Mi and ni (i=i−K) are determined for each block BLi (i=1−K). And, in the ith block BLi, each time when the position controlling clock has been input into the control circuit 50 by Mi pulses, the control circuit 50 outputs the clock CK, whereby the rate of frequency division of the frequency divider 56 is changed by the amount of delta N. In the block BLi, generation of clock CK takes place over ni number of times. Thus, the block BLi corresponds to Mi X ni number of the position controlling clocks. And, while the block BLi is being optically scanned, the frequency division is changed by ni X delta N. The values of the number of blocks K, Mi and ni are empirically or theoretically determined according to design conditions of a desired light scanning system such that the frequency fk of the image scanning clock produced from the voltage controlled oscillator 22 sufficiently approximates the ideal frequency changes associated with changes in the scanning speed.

Figure 15:
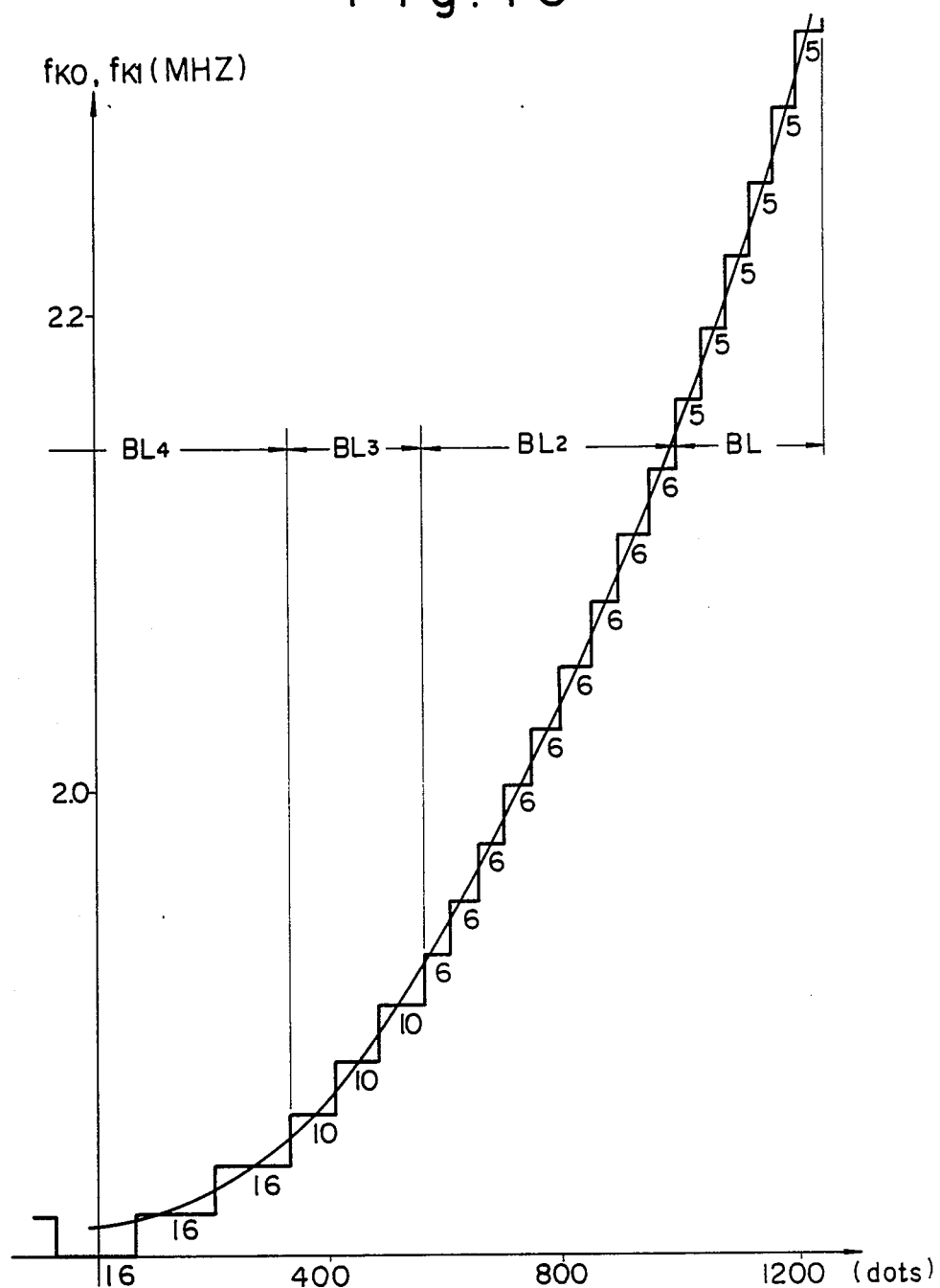
FIG. 15 is a graph which is useful for understanding the operation of the circuit shown in Fig. 11.

One specific example is illustrated in FIG. 15. In the graph of FIG. 15, the smooth curve indicates an ideal image scanning clock $fk_0$ (here, a polygon mirror proposed in the Japanese Patent Application No. 59-274324 is used. In this polygon mirror, between the rotating angle alpha of the polygon mirror and the deflection angle $\theta$ of the light beam, the relation of $\sin \theta = (1 - (A/R) \sin \alpha)$ holds, where A and R are constants determined by the shape of the polygon mirror.) and the stepwise curve indicates the frequency $fk_1 = (M/N) \cdot f_0$. A stepwise change is obtained because the rate of frequency division is changed in a stepwise fashion. The numerals 5, 6, 10 and 16 shown below the stepwise curve $fk_1$ correspond to M1, M2, M3 and M4, respectively, with the right end of the figure as the scanning start end. As is obvious from this graph, it holds that n1=6, n2=9, n3=3 and n4=5. It is to be noted that the graph of FIG. 15 shows only half of a symmetric pattern, and, as is obvious from symmetry, it holds that the number of blocks K=7, M5=10, n5=3, M6=6, n6=9, M7=5 and n7=6. And, the switching interval delta N of the rate of frequency division N is equal to unity. As the rate of frequency division is switched in a stepwise fashion, the image scanning clock changes continuously and it sufficiently approximates the ideal frequency variation $fk_1$. Incidentally, the rate of frequency division N is 69 at each end of the scanning region and 89 at the center.

Returning to FIG. 11, the output from the low pass filter 60 is passed through an amplifier 65 to become the correction voltage which continuously changes in response to changes in the scanning speed. As shown in FIG. 10, this correction voltage is applied to the D/A converter 40 where it is subjected to multiplication processing by the reference signal applied to the A/D converter 40 from the counter 20. Thus, a signal corresponding to a product between the reference signal and the correction voltage is output from the D/A converter 40 and this output signal is applied to the semiconductor laser driver circuit 12.

A still further aspect of the present invention will now be described with reference to FIGS. 16 through 22. In this aspect of the present invention, there is provided a laser printer using a laser beam scanning system, which allows to provide an extended life to a laser beam emitting means, such as a laser diode, and to provide a printed image of excellent quality. Described more in detail, in accordance with this aspect of the present invention, provision is made of means for varying the laser power of a laser beam, wherein the level of laser power is decreased while the laser beam is scanning outside a predetermined imaging region of a imaging surface, such as a photosensitive member. That is, a laser printer typically includes a photosensitive member as an imaging member for forming an image thereon, and the photosensitive member typically contains a predetermined imaging region in which an image is formed and a non-imaging region which is outside of the imaging region. A laser beam emitted from a laser beam source is scanned across the photosensitive member having the imaging and non-imaging regions. Thus, the level of laser beam is lowered while scanning across the non-imaging region as compared with the time while scanning across the imaging region.

Figure 16:
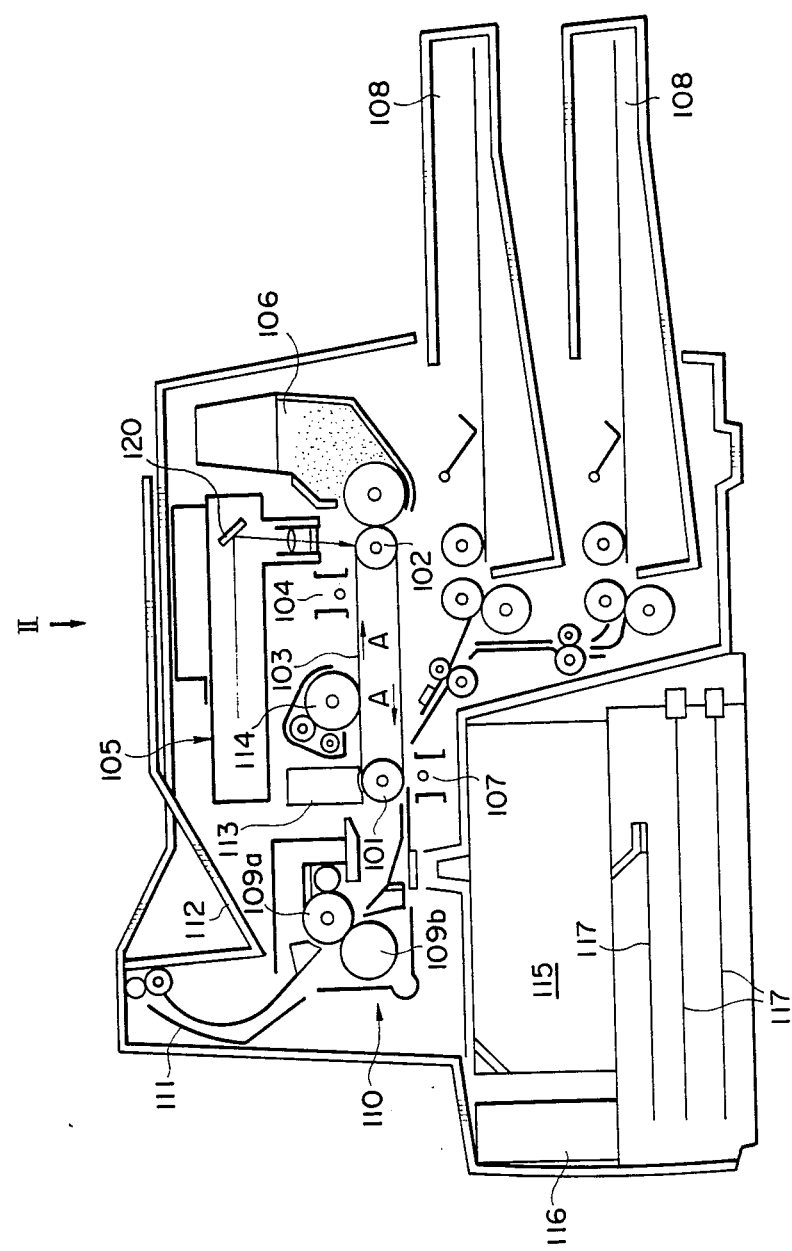
FIG. 16 is a schematic illustration showing a laser printer constructed in accordance with one embodiment of the present invention.

Referring now to FIG. 16, there is illustrated an electrophotographic device or laser printer using a laser beam scanning system. As shown, the laser printer includes a photosensitive member in the form of an endless belt 103 extended between a pair of rollers 101 and 102, at least one of which is driven to rotate, thereby causing the photosensitive belt 103 to move in the direction as indicated by the arrow A. It is to be noted that the outside surface of the photosensitive belt 103 defines an imaging surface which includes an imaging region and a non-imaging region, though not shown specifically. The imaging region is a region in which a desired image is to be formed and the non-imaging region is a region in which no desired image is to be formed. A corona charging device 4 is disposed in the vicinity of the photosensitive belt 104 so that the imaging surface including the imaging and non-imaging regions is uniformly charged to a predetermined polarity as the belt 103 advances clockwise. The thus charged imaging region is then subjected to image exposure by means of a laser beam exposure device 105 so that the uniform charge is selectively dissipated in accordance with a light image pattern, thereby forming an electrostatic latent image on the imaging region of the belt 103. Then, this latent image is developed by a developing device 106 and the developed image is carried on the belt 103 until it comes to a location where an image transfer device 107 comprised of a corona charging device is disposed.

A transfer sheet is transported into a gap between the transfer device 107 and the belt 103 as fed from one of a pair of sheet feeding trays 108 and 108 arranged one on top of the other, so that the transfer sheet thus transported is brought into contact with the belt 103, whereby the developed image on the belt 103 is transferred onto the transfer sheet. Then, the transfer sheet is separated away from the belt 103 and moves past a heat roller image fixing device 110 including a pair of rollers 109a and 109b, so that the transferred image becomes permanently fixed to the transfer sheet. Then, the transfer sheet is transported along a curved transporting path 111 defined in a housing of the printer to be discharged onto a sheet stacker 112. It is to be noted that reference numeral 113 indicates a discharging device for removing residual charge from the belt 103 and reference numeral 114 indicates a cleaning device for cleaning the belt 103 before presenting the belt 103 for another cycle of electrophotographic imaging process. In addition, reference numerals 115, 116 and 117 indicate a power supply, a ventilating fan and a control circuit board, respectively.

Figure 17:
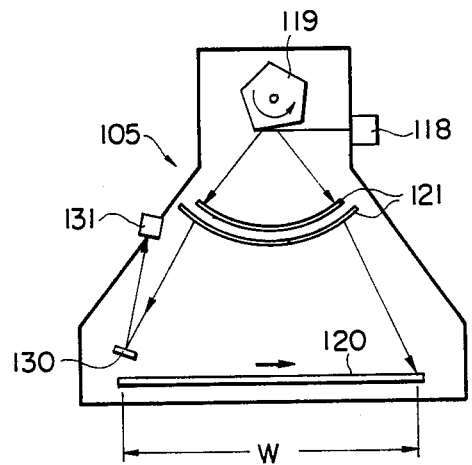
FIG. 17 is a schematic illustration of the laser beam scanning system incorporated in the laser printer of FIG. 16 when viewed in the direction indicated by the arrow II shown in FIG. 16.

FIG. 17 shows the overall structure of the laser beam exposure device 105 when viewed in the direction indicated by the arrow II in FIG. 16, and, as shown, it includes a laser diode (LD) unit 118, a polygon mirror 119 which rotates at an appropriate speed and deflects a laser beam emitted from the LD unit 118 over a predetermined angle repetitively, a reflecting mirror 102 for leading the laser beam deflected by the polygon mirror 119 toward the photosensitive member 103 (FIG. 16) and a $f\theta$ lens 121 disposed between the polygon mirror 119 and the reflecting mirror 120. As the polygon mirror 119 rotates counterclockwise in FIG. 17, the laser beam is deflected from the left of the polygon mirror 119 to the right thereof. Thus, when viewed in FIG. 16, the laser beam is scanned in the direction perpendicular to the sheet of the drawing from the viewer's side toward the sheet of the drawing. Accordingly, the photosensitive member 103 is optically scanned in a direction perpendicular to the direction of travel (i.e., direction A in FIG. 16 which is often called the auxiliary scanning direction). This optical scanning direction is often called the main scanning direction. Thus, while the belt 103 moves in the auxiliary scanning direction A, the optical scanning is carried out repetitively in the main scanning direction, so that an electrostatic latent image is formed on the belt 103.

Figure 18:
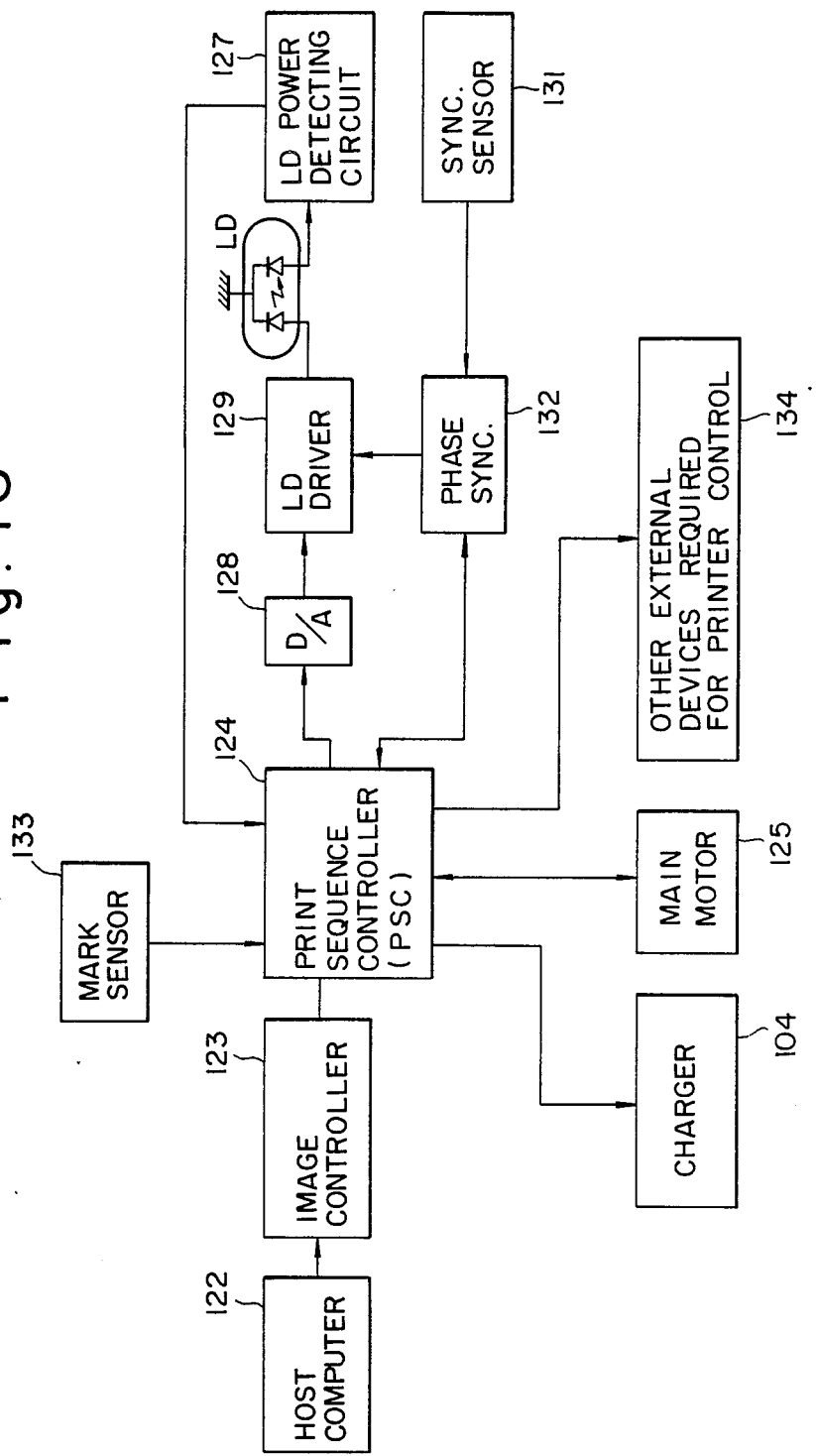
FIG. 18 is a block diagram showing a control circuit provided in the laser printer of FIG. 16.

FIG. 18 shows in block form a control system of the above-described laser printer. As shown, an image signal containing image information, such as letters and graphics, is transferred from a host computer 122 to an image controller 123. At the image controller 123, the received image signal is converted into a corresponding dot pattern which is then supplied to a printer sequence controller (PSC) 124. And, at the same time, a print start signal indicating to initiate a print operation is supplied to PSC 124. Upon receipt of this print start signal, PSC 124 activates a main motor 125 which causes the photosensitive member 103 (FIG. 16) and other related components to be driven. The main motor 125 is provided with a pulse generating function, and the pulses generated by the main motor 125 in operation are counted by a counter incorporated in PSC 124.

Figure 19:
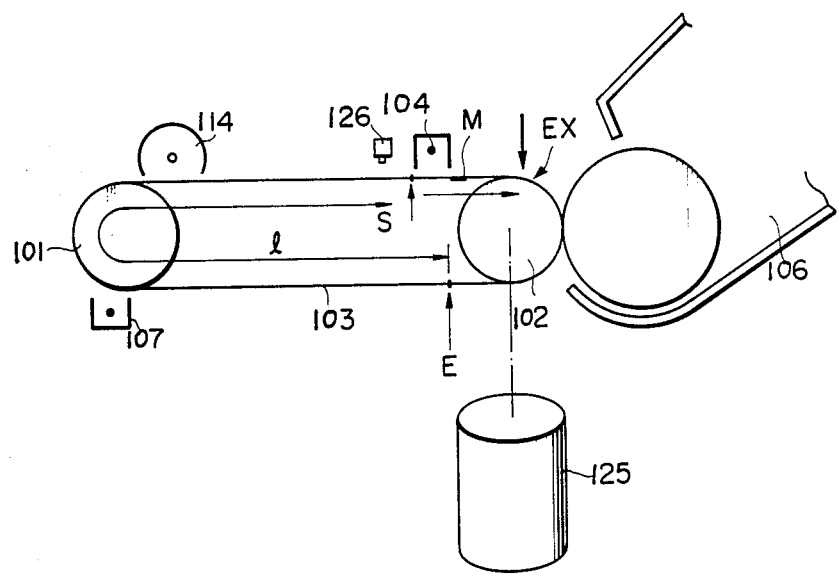
FIG. 19 is a schematic illustration showing on an enlarged scale a photosensitive belt and some components disposed in the vicinity thereof in the laser printer of FIG. 16.
Figure 21:
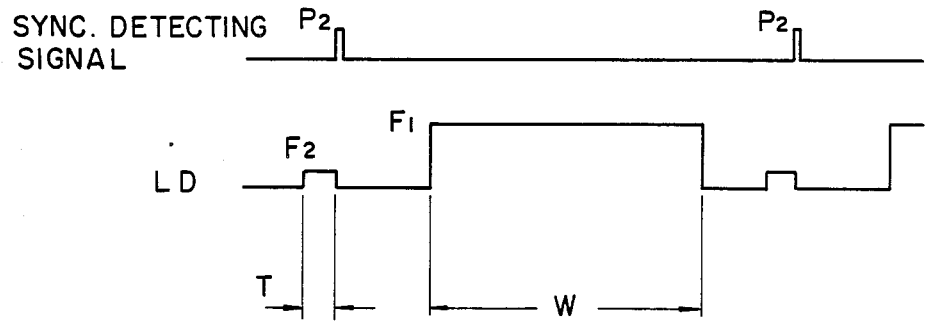
FIG. 21 is a timing chart which is useful for understanding the operation of a modified embodiment.
Figure 22:
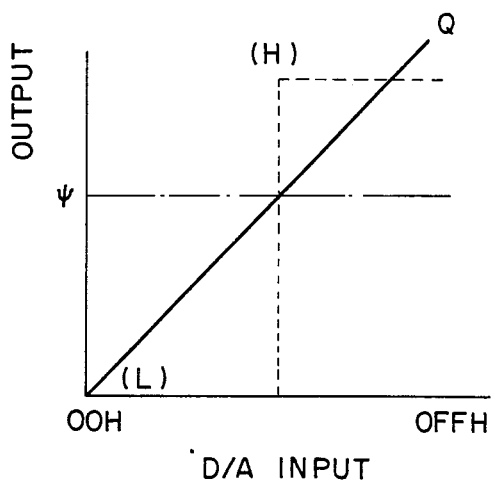
FIG. 22 is a graph useful for understanding how a laser output power may be modified.

As shown in FIG. 19, a mark detecting sensor 26 for detecting a mark M provided on a predetermined position on the photosensitive belt 103 is disposed in the vicinity of the corona charging device 104. Thus, as the photosensitive belt 103 driven to travel by the main motor 125 completes one cycle of travel, a detection pulse $P_1$ is generated as shown in FIG. 20. It should be noted that electrophotographic process steps, such as charging, image exposure and developing, are carried out at a predetermined timing in accordance with the timing pulses from the main motor 125 using the detection pulse $P_1$ as a reference pulse. In the illustrated embodiment, after elapsing a predetermined time period from the detection pulse $P_1$ and at time $t_1$ in the timing chart of FIG. 20, the corona charging device 104 is turned on to carry out a charging step. FIG. 19 illustrates the status at this point in time, and, thus, that portion S of the photosensitive belt 103 which is opposite to the corona charging device 104 is defined as a print start position. When time $t_a$ has elapsed after the initiation of charging, the print start position S reaches an exposure position EX where an image exposure step is carried out by the laser exposure device 105. At this time ($t_2$ in FIG. 20), the laser power of the laser diode is increased to a level $F_1$ which is required to carry out an image exposure as shown in FIG. 21, whereby the image exposure step is initiated.

The corona charging device 104 is turned off after the photosensitive belt 103 has been charged over a length corresponding to an image valid range. In the illustrated embodiment, as shown in FIG. 19, a distance between the print start position S and a print end position E which is separated away from the print start position S over a length l in the downstream direction with respect to the direction of movement of the belt 103 is defined as the image valid range. Thus, after initiation of charged under the illustrated condition, at the time when the print end position E has moved past the corona charging device 104 (i.e., time $t_3$ in FIG. 20), the corona charging device 104 is turned off. Thereafter, when time $t_a$ has elapsed, the print end position E moves past the exposure position EX so that the laser power is decreased to its minimum value $F_3$ and at the same time the image exposure step is terminated.

It is to be noted that, in association with the above-described charging and image exposure steps, various other steps previously described with reference to FIG. 16 are carried out appropriately. It should also be noted that the count up operation by PSC 124 for process control is cleared each time when the detection pulse $P_1$ is generated, i.e., each time when the belt 103 completes one cycle of rotation.

As is obvious from the above description, in accordance with this aspect of the present invention, the laser power of a laser beam emitted from the laser diode LD is increased to a required level $F_1$ while the imaging region or image valid range portion of the belt 103 which is defined between the print start position S to the print end position E on the photosensitive belt 103 is located at the image exposure position EX. And, while the non-imaging region of the belt 103 is located in the image exposure position EX, the laser power is maintained at a reduced level $F_3$. In general, the life of a laser beam emitting device, such as a laser diode, is determined by the magnitude of driving current supplied thereto. Thus, in accordance with this aspect of the present invention, since a relatively large amount of current is supplied to the laser diode only when it is required, the laser diode can have a maximum service life.

It is to be noted that a mechanism for varying the laser power of a laser diode in accordance with this aspect of the present invention should not be limited to any special structure. For example, as shown in FIG. 18, it can be so structured that use is made of a D/A converter 128 and a LD driver 129 for driving the laser diode LD and the power of a laser beam emitted from the laser diode LD can be controlled by a LD power detecting circuit 127. With this structure, as an input to the D/A converter 128 is gradually incremented from 00H, the laser power of a laser beam emitted from the laser diode LD gradually increases as indicated by a straight line Q in the graph shown in FIG. 22. When the detected power exceeds a predetermined reference value phai which is previously set in the LD power detecting circuit 127, the output from the circuit 127 changes from "L" to "H", whereby, with this H signal, the laser power having reached a predetermined level, such as level $F_1$ required to carry out image exposure, can be known.

Therefore, when a large amount of light is required corresponding to the imaging region, the input to the D/A converter 128 is increased until the output of the LD power detecting circuit 127 becomes "H." On the other hand, when a minimum amount of light is to be maintained corresponding to the non-imaging region, the input to the D/A converter 128 is limited to a level which does not cause the output of the LD power detecting circuit 127 to become "H." Alternatively, it may be so structured that the bit value of the input to the D/A converter 128 at the time when the LD power detecting circuit 127 becomes "H", i.e., when the laser power level exceeds the reference value phai, is previously stored in a memory, wherein the laser diode LD is driven by this stored bit value corresponding to the imaging region and the laser diode LD is driven by an input bit value which corresponds to a lower laser power level corresponding to the non-imaging region.

The above description relates to the case in which the laser power is decreased corresponding to the non-imaging region of the photosensitive member in the auxiliary scanning direction, i.e., the travelling direction of the photosensitive member 103. It should, however, be noted that controlling of laser power may also be carried out in the main scanning direction, if desired, and another embodiment directed to control the laser power in the main scanning direction will be described hereinbelow.

As described previously, image exposure in the main scanning direction is carried out by the rotation of the polygon mirror 119. In this case, image exposure within the imaging region of the photosensitive member 103 is executed while the laser beam deflected by the polygon mirror 119 moves across a predetermined width W of the reflecting mirror 120. Thus, when the laser beam is directed outside the width W of the reflecting mirror 120, this laser beam does not impinge on the imaging region of the photosensitive member 103 but impinge on the non-imaging region or outside of the photosensitive member 103. As described previously, to maintain the laser power at a high level when the laser beam is directed outside of the imaging region is disadvantageous from various reasons, such as power consumption and service life of the laser diode. Accordingly, it is preferable to control the laser power such that it is maintained at a high level of $F_1$ only when the laser beam is directed within the width W of the imaging region and the laser power is decreased to a lower level or the laser diode is shut off, if appropriate, when the laser beam is directed outside the width W of the imaging region. The timing to change the laser power in this case can be easily determined by PSC 124 which is in charge of the print process control based on the timing pulse.

However, there may be a case which requires a special caution when the laser power is turned off when the laser beam is directed outside of the imaging region in the maine scanning direction. This is the case when use is made of a laser exposure device of the type in which, as shown in FIG. 17, a sync detecting mirror 130 is disposed at a location in the non-imaging region and the laser beam deflected by the polygon mirror 119 is reflected by this sync detecting mirror 130 to be received by a sync sensor 131. An output from the sync sensor 131 is supplied to a phase sync circuit 132 as shown in FIG. 18. The phase sync circuit 132 supplied a start command to the LD driver 129 so as to cause the imaging region of the photosensitive member 103, whose rotary motion is controlled by PSC 124, to be in synchronism with the laser beam. In this type of laser exposure device, if the laser beam were turned off when it is directed toward the non-imaging region, the above-described synchronizing operation cannot be carried out. To cope with such a situation, in the embodiment shown in FIG. 21, the laser power is set at level $F_1$ which is required to carry out image exposure during a time period in which the laser beam is directed within the imaging region determined by the predetermined width W of the mirror 120, and, the laser power is set at a lower level $F_2$ during a time period T in the non-imaging region. This time period T is determined such that the laser beam emitted during this time period T impinges on the sync detecting mirror 130, and, thus, its timing is previously set in the phase sync circuit 132. When this sync detecting laser beam is detected by the sync sensor 131, the sync detecting signal $P_2$ is generated at that time, and the laser diode LD is turned off in response to this signal.

In the above-described embodiment, the light amount level $F_2$ of the sync detecting laser beam is set lower than the light amount level $F_1$ of the image exposure laser beam because of the following reasons. That is, if the laser beam deflected by the polygon mirror 119 were to have the light amount level $F_1$ at all times, then the deflected laser beam, when scanning in the non-imaging region, would impinge on other components than the mirror 120, thereby causing diffused reflection or light scattering. Such scattered light could then be lead to the photosensitive member 103 (FIG. 16) through the mirror 120, so that the scattered light could be incident upon the imaging region. As a result, undesired images, such as white streaks, could be created as superposed on a desired image. However, if the light amount level $F_2$ is maintained at low level as in the above-described embodiment, the effect of such scattered light can be reduced substantially. For this reason, it is preferable to set the light amount level $F_2$ of the detecting laser beam to be a minimum value which can be detected by the sync sensor 131.

Now, a still further aspect of the present invention will be described wit particular reference to FIGS. 23 through 26. This aspect of the present invention relates to a sync signal generating photodetecting device for use in a laser beam scanning system for forming an image by a laser beam. As described before with reference to FIG. 27, the typical prior art laser beam scanning system includes the sync detecting device 212 which is provided with the light-receiving element 213 and which generates a horizontal sync signal upon detection of the detecting laser beam by the light-receiving element 213. In this case, however, since the light-receiving surface of the light-receiving element 213 is reflective, the laser beam impinging on the light-receiving element 213 is partly reflected. Thus, if the light-receiving surface were oriented to be perpendicular to the direction of incident laser beam, the reflected laser beam would trace back the same path as that of the incident laser beam and thus would be reflected by the mirror 211 and then by the $f\theta$ lens 206 to be directed toward the photosensitive surface 209. Because of the tolerances in mounting of the light-receiving element, the reflected laser beam may proceed in a direction passing by the mirror 211 as indicated by the dotted line, in which case the reflected beam will also come to impinge on the photosensitive surface 209 if it is incident upon the mirror 207. This is undesirable because such reflected laser beam could cause undesired white streaks in the resulting image, so that it could deteriorate the quality of resultant image.

This aspect of the present invention is directed to solve the above-described disadvantages and to provide a novel sync detecting photodetector device which is simple in structure and which can prevent the reflected laser beam from the sync detecting light-receiving element from producing undesired images, such as white streaks. In order to attain this objective, in accordance with this aspect of the present invention, the light-receiving surface of a light-receiving element provided in a photodetector device is disposed at a predetermined angle with respect to a plane which is normal to the incident laser beam such that the reflected laser beam from the light-receiving surface does not impinge on an imaging surface directly or indirectly through reflection at a sync detecting reflecting mirror.

Figure 23:
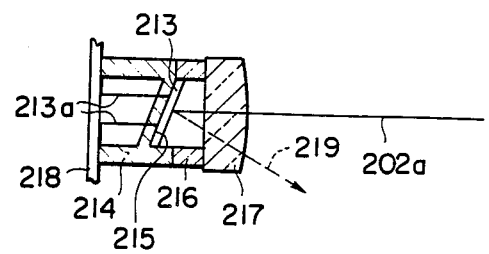
FIG. 23 is a schematic illustration showing a sync signal generating device for use in a laser beam scanning system constructed in accordance with one embodiment of the present invention.
Figure 24:
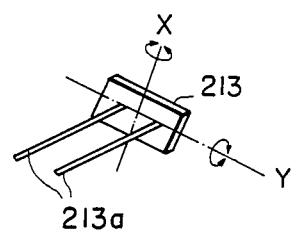
FIG. 24 is a perspective view showing a light-receiving element provided in the sync signal generating device of FIG. 22.

Referring now to FIG. 23, there is shown a sync signal generating photodetector device constructed in accordance with one embodiment of the present invention. The illustrated photodetector device is suitable for use in the laser beam scanning system 212 shown in FIG. 27. In FIG. 23, the device includes a light-receiving element 213 mounted with its back surface fixedly attached to a light-receiving element mounting surface 215 defined in the interior of a cylindrical support member 214. An intermediate ring 216 is fixedly attached to the forward end of the support member 214, and a cylindrical lens 217 is fixedly attached to the forward end of the intermediate ring 216. As shown in FIG. 24, a pair of terminals 213a and 213a is planted at the back surface of the light-receiving element 213. After the light-receiving element 213 is fixedly attached to the support member 214, this pair of terminals is soldered to a printed circuit board 218.

As shown in FIG. 23, in the present embodiment, the light-receiving element mounting surface 215 is defined as an inclined surface which is inclined at a predetermined angle with respect to a plane perpendicular to the incident direction of the sync detecting laser beam 202a.

As a result, the light-receiving surface of the light-receiving element 213 which is mounted with its back surface in intimate contact with the inclined surface is also inclined with respect to the plane perpendicular to the incident laser beam 202a. Thus, the reflected laser beam from the light-receiving surface proceeds in a direction at a predetermined angle with respect to the incident laser beam 202a as indicated by the dotted line in FIG. 23. The support member 214 is so disposed that the reflected laser beam 219 dose not impinge on the sync detecting mirror 211 or the mirror 207. Alternatively, as shown in FIG. 24, the light-receiving element 215 may be so provided in the support member 215 that it extends perpendicularly with respect to the longitudinal axis of the cylindrical support member 215, in which case the support member 215 must be so disposed with its longitudinal axis inclined with respect to the incident laser beam 202a. As a further alternative structure, if the light-receiving element 213 is provided as directly mounted on the printed circuit board 218 without using the support member 216, it is only necessary to mount the light-receiving element 213 on the printed circuit board 218 with its light-receiving surface inclined with respect to the plane which is normal to the incident laser beam.

Figure 26:
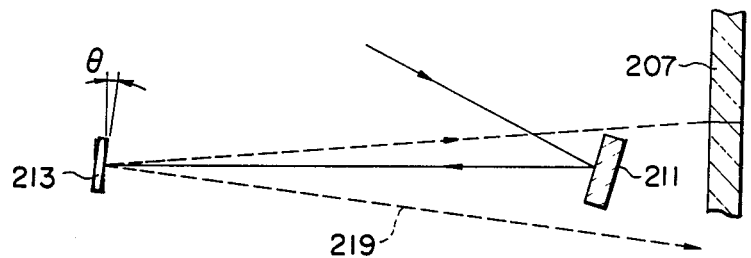
FIG. 26 is a schematic illustration which is useful for understanding the function of each of the sync signal generating devices shown in FIGS. 22 and 24.

In view of the fact that the sync detecting mirror 211 is small areawise and the width of the mirror 207 in the direction perpendicular to the scanning direction is small, it is only necessary to mount the light-receiving element 213 inclined slightly at an angle $\theta$ with respect to the surface normal to the incident laser beam 202a as shown in FIG. 26 even taking into account of the tolerances in the mounting angle of the light-receiving element 213 in order to prevent the reflected laser beam from entering into these mirrors 207 and 211. It is to be noted that the horizontal sync signal generating photodetector device is only required to detect the presence of reflected beam from the mirror 211 and is not required to detect the level of its light amount, so that no particular problem arises even if it is mounted as inclined with respect to the incident light path as described above. It has been empirically found that no false detection resulted even if the light-receiving surface was set at 45°. Accordingly, the intended detecting function is not adversely affected even if the light-receiving surface is set as inclined so as to prevent the reflected laser beam from impinging on the mirror 211 or mirror 207.

Figure 25:
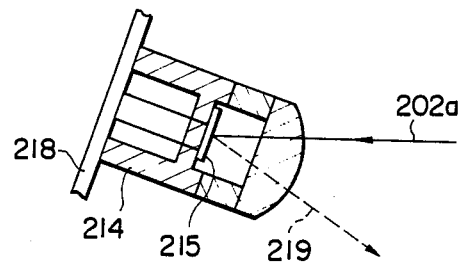
FIG. 25 is a schematic illustration showing a sync signal generating device for use in a laser beam scanning system constructed in accordance with another embodiment of the present invention.

In the structure shown in FIG. 25, the reflected laser beam 219 reflecting from the light-receiving element 213 proceeds within a plane defined by the scanning of the laser beam deflected by the polygon mirror. It is to be noted, however, that the direction of advancement of the reflected laser beam should not be limited only to this direction, and the reflected laser beam may proceed in a plane inclined with respect to the plane defined by the scanning laser beam. In other words, the light-receiving element 213 may be mounted as rotated in either one of both of X and Y axes shown in FIG. 24 for the purpose of this aspect of the present invention. In FIG. 24, Y axis is a horizontal axis and X axis is perpendicular to the Y axis, and the light-receiving surface of the light-receiving element 213 lies on a plane defined by these X and Y axes.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A light beam deflecting device for use in a light beam scanning system, said device comprising:
   a light source for emitting a light beam which may be modulated by image information;
   a rotating polygon mirror for deflecting said light beam over a predetermined angle repetitively, said polygon mirror having a plurality of reflecting surfaces arranged circumferentially with respect to a rotating axis of said polygon mirror;
   means for rotating said polygon mirror in a predetermined direction;
   each of said reflecting surfaces being defined by a curved surface having a radius of curvature denoted by R which has a following relation with respect to a rotating angle D of said polygon mirror and a deflecting angle $2\theta$ of said deflected light beam, $$\sin \theta = \left(1 - \frac{A}{R}\right) \sin D$$

where, A is a radius of a largest circle inscribable within said polygon mirror; and
   a transparent layer formed on each of said reflecting surfaces of said polygon mirror.

2. The device of claim 1 further comprising an anti-reflection film formed on said transparent layer.

3. The device of claim 1 wherein said curved surface is a cylindrical surface.

4. The device of claim 1 wherein said curved surface is a spherical surface.

5. The device of claim 1 wherein said transparent layer has a thickness which varies in a predetermined manner as a function of said rotating angle D of said polygon mirror.

6. The device of claim 1 wherein said transparent layer has an outer surface having a predetermined shape.

7. The device of claim 6 wherein said outer surface is a cylindrical surface.

8. The device of claim 6 wherein said outer surface is a spherical surface.

9. The device of claim 6 wherein said outer surface is a substantially flat surface.

10. A light beam deflecting device for use in a light beam scanning system, said device comprising:
    a light source for emitting a light beam modulated by image information;
    a rotating polygon mirror for deflecting said light beam over a predetermined angle repetitively onto a scanning surface, said polygon mirror having a rotating axis and a plurality of reflecting surfaces arranged circumferentially with respect to said rotating axis;
    means for rotating said polygon mirror in a predetermined direction at a selected rotationals speed to thereby scan said light beam onto said scanning surface at a selected scanning speed;
    each of said reflecting surfaces of said polygon mirror being defined by a curved surface having a radius of curvature denoted by R which is related as follows to a rotating angle D of said polygon mirror and a deflecting angle 2θ of said deflected light beam, $\sin\theta = ((1 - (A/R))\sin D$ where, A is the radius of a largest circle inscribable within said polygon mirror, first means for determining a first signal by detecting an intensity level of said light beam emitted from said light source and comparing said detected intensity level with a predetermined reference level;

second means for generating an image scanning clock signal whose frequency varies as a function of said scanning speed of said light beam on said scanning surface and a second signal which is a selected function of the frequency of said image scanning clock; and third means for producing a third signal in response to said first and second signals, said third signal being applied to said emitting means as a drive signal thereof.

11. The device of claim 10, wherein said first means includes a photodetector for receiving said light beam emitted from said light source to produce an analog detection signal in response to the received light beam, comparing means for comparing said analog detecting signal with said predetermined reference level to produce an analog difference signal, and a counter for receiving said analog difference signal and for converting said analog difference signal into digital data corresponding to said first signal.

12. A device of claim 11, wherein said third means includes a D/A converter which receives said first signal and said second signal and outputs said third signal, wherein said third signal corresponds to a product between said first and second signals.

13. The device of claim 10, further comprising activating means for activating said first means at a predetermined frequency.

* * * * *